United States Patent
Handjojo et al.

(10) Patent No.: US 6,940,557 B2
(45) Date of Patent: Sep. 6, 2005

(54) ADAPTIVE INTERLACE-TO-PROGRESSIVE SCAN CONVERSION ALGORITHM

(75) Inventors: Benitius M. Handjojo, Indianapolis, IN (US); Wenhua Li, Crawfordsville, IN (US)

(73) Assignee: Micronas Semiconductors, Inc., Palatine, IL (US)

(*) Notice: Subject to any disclaimer, the term of this patent is extended or adjusted under 35 U.S.C. 154(b) by 538 days.

(21) Appl. No.: 10/071,711

(22) Filed: Feb. 8, 2002

(65) Prior Publication Data

US 2002/0171759 A1 Nov. 21, 2002

Related U.S. Application Data

(60) Provisional application No. 60/267,356, filed on Feb. 8, 2001.

(51) Int. Cl.[7] .................................................. H04N 7/01
(52) U.S. Cl. ........................ 348/452; 348/448; 348/700
(58) Field of Search ............................... 348/452, 448, 348/700, 625; 382/107, 190, 224

(56) References Cited

U.S. PATENT DOCUMENTS

| | | | |
|---|---|---|---|
| 4,567,599 A | | 1/1986 | Mizoguchi |
| 4,712,221 A | | 12/1987 | Pearce et al. |
| 4,815,103 A | | 3/1989 | Cupo et al. |
| 4,833,693 A | | 5/1989 | Eyuboglu |
| 4,856,031 A | | 8/1989 | Goldstein |
| 4,866,395 A | | 9/1989 | Hostetter |
| 4,989,090 A | * | 1/1991 | Campbell et al. ........... 348/451 |
| 5,052,000 A | | 9/1991 | Wang et al. |
| 5,056,117 A | | 10/1991 | Gitlin et al. |
| 5,134,480 A | * | 7/1992 | Wang et al. ................. 348/620 |
| 5,210,774 A | | 5/1993 | Abbiate et al. |

(Continued)

FOREIGN PATENT DOCUMENTS

| | | |
|---|---|---|
| EP | 0524559 B1 | 5/1997 |
| EP | 0752185 | 7/2002 |
| WO | WO 00/27033 | 5/2000 |
| WO | WO 00/27066 | 5/2000 |
| WO | WO 01/01650 A1 | 1/2001 |
| WO | WO 01/13516 A2 | 2/2001 |
| WO | WO 01/43310 A2 | 6/2001 |
| WO | WO 01/43384 A2 | 6/2001 |

OTHER PUBLICATIONS

Demodulation of Cochannel QAM Signals (continued); Error Detection/Correction; pp. 1–3, http://www.appsig.com/papers/1813f/813f_4.html.

Demodulation of Cochannel QAM Signals (continued); Simulation Results; pp. 1–6; http://www.appsig.com/papers/1813f/813f_5.html.

(Continued)

*Primary Examiner*—Victor R. Kostak
(74) *Attorney, Agent, or Firm*—O'Shea, Getz & Kosakowski, P.C.

(57) ABSTRACT

An interlace-to-progressive scan conversion system comprises: a spatial line averaging prefilter; a motion estimator; a three-stage adaptive recursive filter. The motion estimator comprises: a 3-D recursive search sub-component having a bilinear interpolator; a motion correction sub-component having an error-function including penalties related to the difference between a given candidate vector and a plurality of neighboring vectors; a block erosion sub-component. The motion estimator assumes that motion is constant between fields. The three-stage adaptive recursive filter comprises: a first stage that selects between using static pixels data and moving pixels data from a next field; a second stage that selects a more valid set of data between motion compensated data from a previous field and the pixels selected by the first stage; a third stage that combines an intra-field interpolation with the more valid set of data selected by the second stage.

23 Claims, 27 Drawing Sheets

Block diagram of phase correlated motion estimator

U.S. PATENT DOCUMENTS

| | | | |
|---|---|---|---|
| 5,311,546 A | | 5/1994 | Paik et al. |
| 5,453,797 A | | 9/1995 | Nicolas et al. |
| 5,471,508 A | | 11/1995 | Koslov |
| 5,506,636 A | | 4/1996 | Patel et al. |
| 5,508,752 A | | 4/1996 | Kim et al. |
| 5,532,750 A | * | 7/1996 | De Haan et al. ............ 348/452 |
| 5,537,435 A | | 7/1996 | Carney et al. |
| 5,568,098 A | | 10/1996 | Horie et al. |
| 5,568,521 A | | 10/1996 | Williams et al. |
| 5,588,025 A | | 12/1996 | Strolle et al. |
| 5,619,154 A | | 4/1997 | Strolle et al. |
| 5,648,987 A | | 7/1997 | Yang et al. |
| 5,692,014 A | | 11/1997 | Basham et al. |
| 5,757,855 A | | 5/1998 | Strolle et al. |
| 5,789,988 A | | 8/1998 | Sasaki |
| 5,802,461 A | | 9/1998 | Gatherer |
| 5,805,242 A | | 9/1998 | Strolle et al. |
| 5,828,705 A | | 10/1998 | Kroeger et al. |
| 5,835,532 A | | 11/1998 | Strolle et al. |
| 5,862,156 A | | 1/1999 | Huszar et al. |
| 5,870,433 A | | 2/1999 | Huber et al. |
| 5,872,817 A | | 2/1999 | Wei |
| 5,894,334 A | | 4/1999 | Strolle et al. |
| 5,995,154 A | * | 11/1999 | Heimburger ................ 348/448 |
| 6,005,640 A | | 12/1999 | Strolle et al. |
| 6,034,734 A | * | 3/2000 | De Haan et al. ............ 348/458 |
| 6,034,998 A | | 3/2000 | Takashi et al. |
| 6,044,083 A | | 3/2000 | Citta et al. |
| 6,069,524 A | | 5/2000 | Mycynek et al. |
| 6,133,785 A | | 10/2000 | Bourdeau |
| 6,133,964 A | | 10/2000 | Han |
| 6,145,114 A | | 11/2000 | Crozier et al. |
| 6,154,487 A | | 11/2000 | Murai et al. |
| 6,178,209 B1 | | 1/2001 | Hulyalkar et al. |
| 6,195,400 B1 | | 2/2001 | Maeda |
| 6,198,777 B1 | | 3/2001 | Feher |
| 6,219,379 B1 | | 4/2001 | Ghosh |
| 6,222,891 B1 | | 4/2001 | Liu et al. |
| 6,226,323 B1 | | 5/2001 | Tan et al. |
| 6,233,286 B1 | | 5/2001 | Wei |
| 6,249,544 B1 | | 6/2001 | Azazzi et al. |
| 6,260,053 B1 | | 7/2001 | Maulik et al. |
| 6,272,173 B1 | | 8/2001 | Hatamian |
| 6,275,554 B1 | | 8/2001 | Bouillet et al. |
| 6,278,736 B1 | * | 8/2001 | De Haan et al. ........ 375/240.16 |
| 6,304,614 B1 | | 10/2001 | Abbaszadeh et al. |
| 6,307,901 B1 | | 10/2001 | Yu et al. |
| 6,333,767 B1 | | 12/2001 | Patel et al. |
| 6,356,586 B1 | | 3/2002 | Krishnamoorthy et al. |
| 6,363,124 B1 | | 3/2002 | Cochran |
| 6,411,341 B1 | * | 6/2002 | De Haan et al. ............ 348/714 |
| 6,411,659 B1 | | 6/2002 | Liu et al. |
| 6,415,002 B1 | | 7/2002 | Edwards et al. |
| 6,421,378 B1 | | 7/2002 | Fukuoka et al. |
| 6,438,164 B2 | | 8/2002 | Tan et al. |
| 6,452,639 B1 | * | 9/2002 | Wagner et al. .............. 348/448 |
| 6,466,630 B1 | | 10/2002 | Jensen |
| 6,490,007 B1 | | 12/2002 | Bouillet et al. |
| 6,493,409 B1 | | 12/2002 | Lin et al. |
| 6,507,626 B1 | | 1/2003 | Limberg |
| 6,535,553 B1 | | 3/2003 | Limberg et al. |
| 6,611,555 B2 | | 8/2003 | Smith et al. |
| 6,734,920 B2 | | 5/2004 | Ghosh et al. |
| 2001/0048723 A1 | | 12/2001 | Oh |
| 2002/0024996 A1 | | 2/2002 | Agazzi et al. |
| 2002/0136329 A1 | | 9/2002 | Liu et al. |
| 2002/0154248 A1 | | 10/2002 | Wittig et al. |
| 2002/0172275 A1 | | 11/2002 | Birru |
| 2002/0172276 A1 | | 11/2002 | Tan et al. |
| 2002/0186762 A1 | | 12/2002 | Xia et al. |
| 2002/0191716 A1 | | 12/2002 | Xia et al. |
| 2003/0058967 A1 | | 3/2003 | Lin et al. |

OTHER PUBLICATIONS de Haan et al., "Deinterlacing—An Overview", Proceedings of the IEEE, vol. 86, No. 9, pp. 1837–1856 (Sep. 1998).

de Haan et al., "De–Interfacing of Video Data", IEEE Transactions on Consumer Electronics, vol. 43, No. 3, pp. 819–824 (Aug. 1997).

Wang et al., "Time–Recursive Deinterfacing for IDTV and Pyramid Coding", Elsevier Science Publishers B.V., vol. 2, No. 3, pp. 365–374 (Oct. 1990).

* cited by examiner

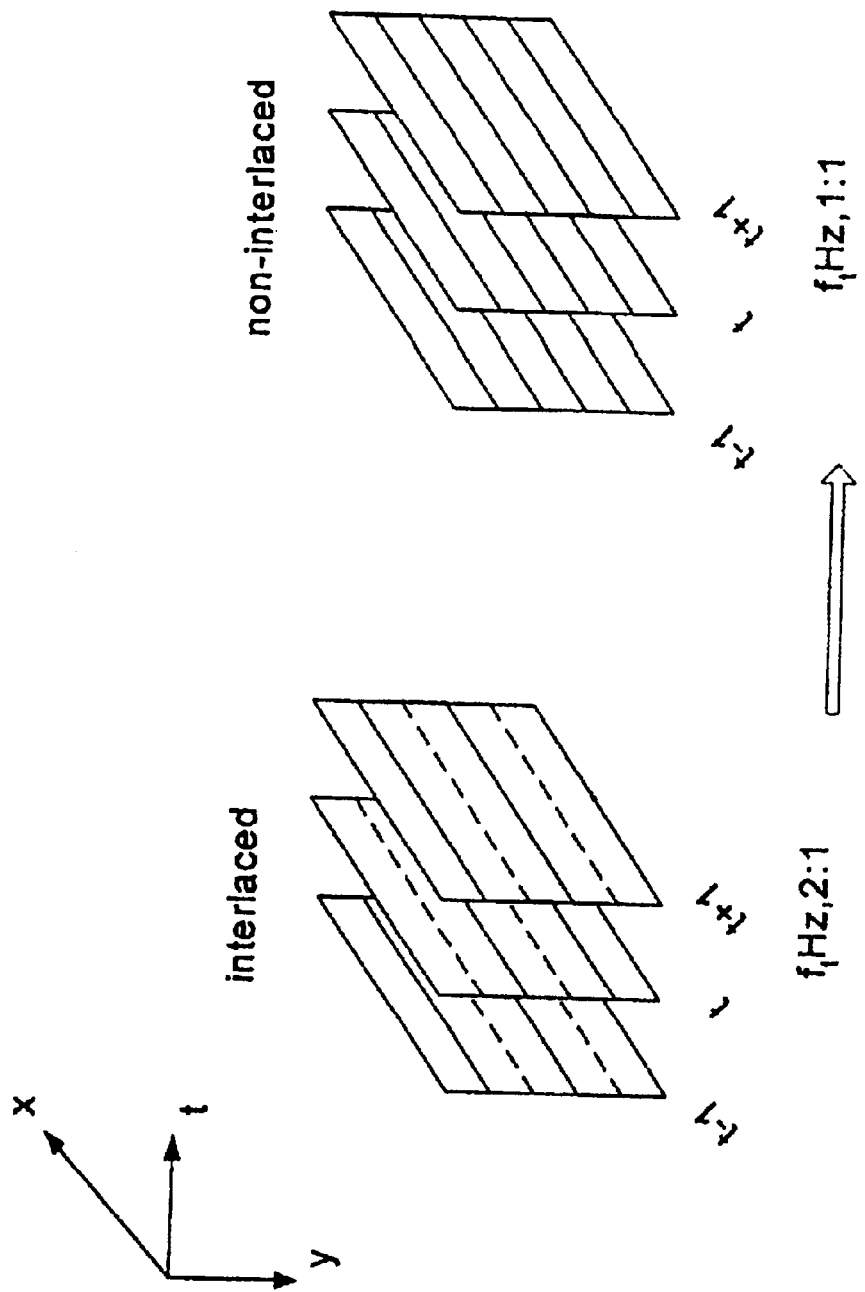
Fig. 1 interlace to progressive scan conversion task

VT spectrum of a 50 Hz video signal, with vertical frequencies in cycles per picture height(c/ph)   (a) No motion   (b) Vertical motion.

Fig.2.3 (a) Spectrum of the interlaced input. (b) target spectrum of the deinterlacer.

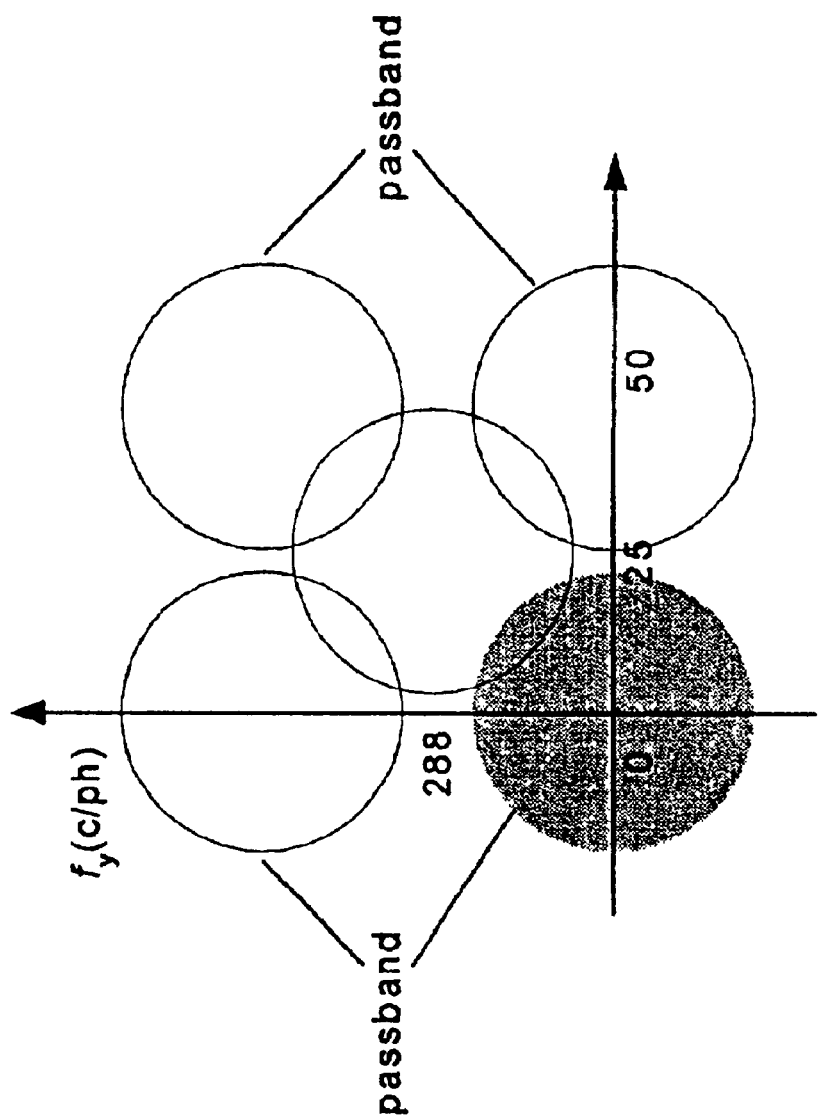
Fig. 4 Video Spectrum and a VT filter

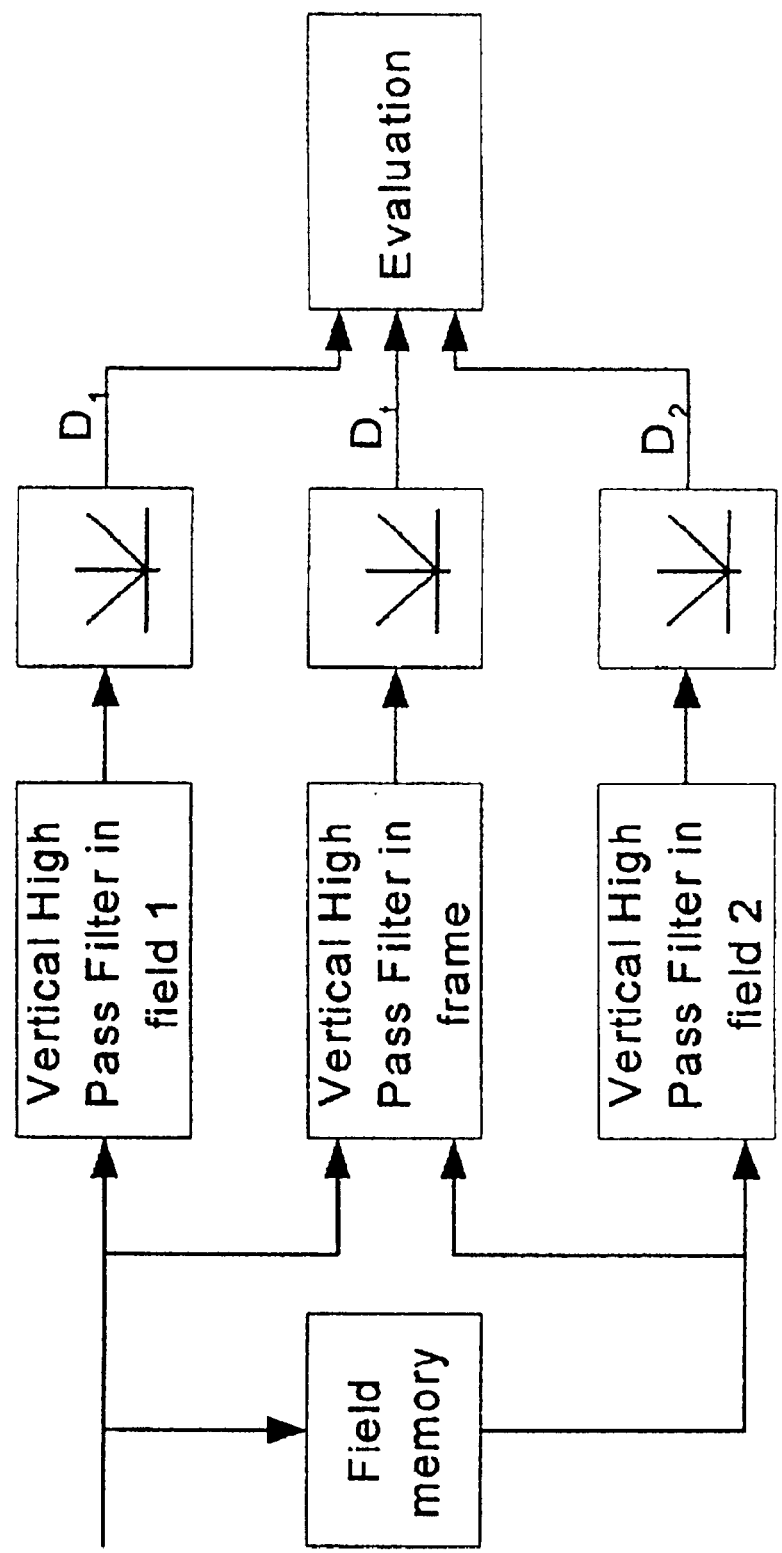
Fig. 5 Schematic of a Mouse's Teeth Detector

Coefficient of the vertical high pass filters by means of a Mouse's Teeth Detector Fig. 8 The FIR Median Hybrid The principle of gradient matching. The luminance gradient across the screen is compared with that through time Basic Components of a phase correlator Block diagram of phase correlated motion estimator Motion estimation of $B(x, y, t)$ within the search window. Notice that the $\overline{MV}(x,y,t)$ range is $\pm n1$ and $\pm m2$.

A one-at-a-time search and conjugate Direction search

Hierarchical Block Matching Algorithm for motion estimation

The 2D convergence principle

Fig. 21 Locations of the predictions around current block.

Fig. 22 Location of the spatial predictions of estimators a and b with respect to the current block. The arrows indicate the convergence directions.

Basic Block Diagram of the Adaptive Interlace to Progressive Scan Conversion

Illustration of motion vector correction algorithm

ADAPTIVE INTERLACE-TO-PROGRESSIVE SCAN CONVERSION ALGORITHM

CROSS-REFERENCE TO RELATED APPLICATION

This application claims priority from U.S. Provisional Application No. 60/267,356, filed Feb. 8, 2001.

BACKGROUND

To interlace or not to interlace has been a contentious issue between the television and computer communities. To the general public, there appears to be little difference between the television set and the computer monitor. However, those skilled in the art appreciate the fundamental difference of the video data formats in television and in computer monitors. Current television technology uses an interlaced scanning method. In this approach images are divided into several frames. Each frame is handled like a two-dimensional matrix; for US NTSC signals each frame has 525 lines. At each consecutive time, only one half of the lines are drawn, skipping every other line. Then the remaining lines are drawn, interlacing with the previous one. Computer monitors, on the other hand, use a progressive scanning approach that scans all the lines in order from top to bottom in a single frame.

At first, interlaced scanning was used because of some of its technological and psychophysical advantages. Interlacing was an efficient method to reduce bandwidth when TV frame memories were expensive and TV broadcast bandwidth was limited. Interlacing also takes advantage of psychophysical properties of human visual system. For example, the human visual system is less sensitive to flickering details than to large area flicker. Doubling the scanning frequency reduces the large area flickering. By only transmitting half of the information at a time, a higher scanning frequency can be achieved using the same bandwidth, which is one of interlacing's principal advantages. However, in addition to the loss of vertical resolution, interlacing results in many well-known artifacts such as line flicker. Line flicker happens when high vertical spectrum components in static images are present. It also produce vertical-temporal aliasing in moving images, if there is no appropriate vertical band limitation. Another major flaw of interlacing is that it complicates many images processing tasks, especially scanning format conversion.

Even though it seems that both interlaced scanning and progressive scanning each have a well-established area, with the advancement of the technology, especially in multimedia area, the demand for television video and personal computer video to converge is becoming irresistible. With the emergence of the new High Definition Television (HDTV) technology, a good algorithm for interlace-to-progressive scan conversion is becoming even more important, since many of the HDTV proposals either involve transmission of interlaced video, or high spatial frequency information at a reduced temporal rate. The consumer wants to be able to view a standard NTSC signal from broadcast or VCR in the new HDTV, but because of the nature of HDTV, the artifacts in a standard NTSC signal are becoming more visible and annoying when displayed on in high-definition television video. On the other hand, consumers also want to utilize their HDTV up to the maximum potential. A good interlace-to-progressive scan algorithm is needed to convert a standard NTSC signal to an HDTV signal.

Interlace-to-progressive scan conversion (which is sometimes called deinterlacing) can be described as interpolating the missing lines of an interlaced sequence. It can also be seen as a resolution enhancement technique, which can use either linear or non-linear interpolation (or both), or as a process to recover the alias component. If the interlacing process is seen as a form of spatio-temporal sub-sampling then interlace-to-progressive scan conversion is the reverse operation aiming at the removal of the sub-sampling artifact. From the mathematical perspective, the process of interlace-to-progressive scan conversion is a problem in linear up-sampling conversion.

A number of different interlace-to-progressive conversion algorithms have been proposed in the last few years. These algorithms range from simple spatial, temporal, or spatio-temporal conversion algorithms or filtering, to more advance motion adaptive filtering, to the most advanced adaptive conversion algorithm with motion estimation. Despite years of research, most of the algorithms are only suitable for specific image characteristics. In each case, the spectral content of the video data is different and hence requires different approaches. The challenge, therefore, is to implement an algorithm that can be adapted to various image characteristics. Unfortunately this is not a simple problem since interlace-to-progressive scan conversion, suffers from some fundamental problems. For example, though a few algorithms can adapt to various image characteristics, most of them are too complicated to implement in real applications.

In interlaced scanning, each frame is divided into two fields. The field is normally divided into top and bottom fields, the top field having the odd lines and the bottom having the even lines. These two fields are transmitted alternately. For the purposes of this paper the terms top and bottom field will be used for normal discussion, while odd and even fields with starting line equal to 1 is used whenever relation between frame/field number and line in the frame/field should be emphasized.

FIG. 1 illustrates the interlace-to-progressive scan conversion, or deinterlacing, task. The input video fields, containing samples of either the top or bottom vertical grid positions (lines) of an image, have to be converted to frames. These frames represent the same image as the corresponding $$F_o(x, y, t) = \begin{cases} F(x, y, t), & (y \bmod 2 = t \bmod 2) \\ F_i(x, y, t), & (\text{otherwise}) \end{cases} \quad (1.0)$$

input field but contain the samples of all lines. Formally, the output frame $F_o(x,y,t)$ can be defined as:

where: $F(x, y, t)$ is the pixels from the original line from the input field x, y are coordinates in the spatial plane, t is coordinate in temporal domain $F_i(x,y,t)$ is the interpolated pixels The interlace-to-progressive scan conversion process doubles the frequency in vertical space. The process removes the first repeated spectrum caused by the interlaced sampling of the video. At first interlace-to-progressive scan conversion seems like an easy task. However, due to lack of prefiltering in the interlacing process, the interlace-to-progressive scan conversion process is not as simple as it looks like.

There are two major problems confronting interlace-to-progressive scan conversion processes. The first is that TV signals do not fulfill the demands of the sampling theorem, i.e., it doesn't satisfy the Nyquist criteria. Interlaced scanning introduces aliasing, unless the moving image is properly pre-filtered with a low pass filter. In actual image capturing devices, temporal filtering is performed by camera time integration, and is performed independently of spatial filtering, resulting in separable prefiltering. In most practical systems, there is no prefiltering to suppress the higher frequencies prior to sampling in TV signals. Hence, some of the information is lost during the interlaced sampling process. From frequency domain point of view, some of the higher frequencies still lie outside the sampling frequency, and thus cause aliasing.

The second major problem is that the temporal frequencies at the retina of an observer have an unknown relation to the scene content. The results from psychophysical experiments shows that temporal filtering blurs moving objects due to eye tracking. High frequencies due to object motion are mapped to zero frequency (DC) at the retina if the observer tracks the object. Consequently, suppression of such apparently high and less relevant frequencies results in significant blurring for this viewer. Due to this complication the apparent quality of interlaced video is best if it comes from progressive video by dropping half the lines with motion adaptive prefiltering. In most cases, motion adaptive prefiltering is not feasible, and interlacing is done without any prefiltering.

FIG. 2a shows the vertical temporal (VT) video spectrum of a static scene. This spectrum includes baseband and spectral replicas due to the interlaced sampling. The sampling lattices result in a quincunx pattern of the centers of the spectral replicas. The vertical detail of the scene determines the extent of the VT spectrum support, while vertical motion changes its orientation, as illustrated in FIG. 2b. FIG. 3a illustrates the general spectrum for an interlaced signal with motion, and FIG. 3b shows the ideal spectrum result from an interlace-to-progressive scan conversion process. Clearly, interlace-to-progressive scan conversion is a spatio-temporal problem.

Over the last 30 years researchers have proposed many different algorithms for interlace-to-progressive scan conversion. So far no one has discovered an algorithm that can perfectly deinterlace every image sequence. One major division among these algorithms is motion compensation. Most of the algorithms that were introduced before 1990 used motion non-compensated methods. They fall generally into the categories of linear and non-linear methods. Linear methods are the best methods in the absence of motion. These methods are considered outdated within the TV-product community. However they are still widely used in the computer community, especially for multimedia products.

Linear methods are well-known for their low cost of implementation. All linear methods, whether using spatial, temporal, or spatio-temporal filtering can be defined by:

$$F_o(x, y, t) = \begin{cases} F(x, y, t), & (y \bmod 2 = t \bmod 2) \\ \sum_k F(x, y+k, t+n)h(k, n), & \text{(otherwise)} \end{cases} \quad (1.1)$$

where: $k, n \in \{ \ldots, -1, 0, 1, \ldots \}$ $h(k, n)$ = impulse response of the filter in the VT The choice of $h(k,n)$ depends upon whether it is a spatial, temporal or spatio-temporal filter.

Spatial linear interlace-to-progressive scan conversion uses the correlation between vertical neighboring pixels to interpolate the missing pixels. It has the characteristic of passing all temporal frequency responses, which guarantees the absence of motion artifacts. Defects occur with high vertical frequencies only. It is easy to implement and has the lowest hardware requirement since normally it only requires a few lines of buffer instead of one field buffer. It also doesn't require a complex computation to execute its filtering algorithm.

The simplest form of the spatial progressive scan conversion algorithm is line repetition. This algorithm doubles every line in the original fields. The frequency response of this interpolator is given by:

$$H_y(f_y) = |\cos(\pi f_y)|$$

where:
$f_y$ is the vertical frequency (normalized to the vertical sampling frequency)
$H_y(f_y)$ is the frequency response in the vertical direction
This frequency characteristic has no steep roll off. As a consequence, the first spectral replica is not much suppressed, while the baseband is partly suppressed. This causes alias and blur in the output signal.

Line Averaging is the most popular and commonly used Spatial filtering algorithm. It can be defined by equation (1.0) above, with $h(k,0)=0.5$ for $k=\pm 1$ and $h(k,n)=0$ otherwise. The frequency response:

$$H_y(f_y) = \frac{1}{2} + \frac{1}{2}\cos(2\pi f_y) \quad (1.2)$$

indicates a higher alias suppression. However, this suppresses the higher part of the baseband spectrum as well which causes the output signal to be blurred. In general, purely spatial filters cannot discriminate between baseband and repeat spectrum regardless of their length.

Temporal interlace-to-progressive scan conversion uses the correlation in the time domain. Pure temporal interpolation has the characteristic of passing all the spatial frequencies. Consequently, there is no degradation in stationary images.

The most popular temporal filtering algorithm is field insertion. The scan conversion is done by inserting the lines from the previous field to replace the missing lines. The formal definition is given by equation (1.0) with $h(0,-1)=1$ and $h(k,n)=0$ otherwise. The frequency characteristic is analogous to the line repetition given in equation (1.1), the only difference being that $f_y$ is replaced with $f_t$.

Field insertion, also called "Weave" in PC world, provides an all-pass characteristic in the vertical frequency domain. It is the best solution in case of still images, as all vertical frequencies are preserved. However, moving objects are not shown at the same position for odd and even lines of a single output frame. This causes serration of moving edges, which is a very annoying artifact.

Longer temporal finite duration impulse response (FIR) filters require multiple field storage. Unlike signal processing for audio signals, this will increase the storage requirement significantly. Therefore it is economically unattractive. Furthermore, they still cannot discriminate between baseband and repeated spectra.

A spatio-temporal interpolation filter would theoretically solve the interlace-to-progressive scan conversion problem if the signal were band-limited prior to interlacing. The required pre-filter would be similar to the up-conversion filter. The required frequency characteristic is shown in FIG. 4.

Although the pre-filter is missing, and there are problems with motion tracking viewers, FIG. 4 illustrates that the spatial-temporal filter is certainly the best linear approach in that it prevents both alias and blur in stationary images. The vertical detail is gradually reduced with increasing temporal frequencies. Such a loss of resolution with motion is not unnatural.

The filter is usually designed such that the contribution from the neighboring fields is limited to the higher vertical frequencies. As a consequence, motion artifacts are absent for objects without vertical detail that move horizontally. Early versions of the Spatial-Temporal filtering reduces the filter into only two-dimensional (Vertical-Temporal) filter. The version that gives the best result, however, utilized other spatial neighboring pixels and can be defined as:

$$F_0(x, y, t) = \begin{cases} F(x, y, t) & (y \bmod 2 = t \bmod 2) \\ \dfrac{\sum_k F(x, y+k, t+n)h(k, n)}{18} & \text{(otherwise)} \end{cases} \quad (1.3)$$

$$h(k, n) = \begin{cases} 1, 8, 8, 1 & (k = -3, -1, 1, 3) \wedge (n = 0) \\ -5, 10, -5 & (k = -2, 0, 2) \wedge (n = -1) \\ 0 & \text{(otherwise)} \end{cases}$$

Linear Temporal interpolators are perfect in the absence of motion. Linear Spatial methods have no artifacts in case of no vertical detail occurs. It seems logical therefore, to adapt the interpolation strategy to motion and/or vertical detail. Many such systems have been proposed, mainly in the 1980's. The basic concept of these methods is that the methods have some kind of motion detection, which is implemented either implicitly or explicitly. The motion detector is used to decide whether the algorithm will do inter-field interpolation or intra-field interpolation. Inter-field interpolation is used in static situations while the intra-field interpolation is used with motion.

Non-linear algorithms consist primarily of implicitly adaptive, nonlinear algorithms and some explicitly adaptive nonlinear algorithms with motion detector (MD) algorithms. The implicitly adaptive, nonlinear algorithms provided the best affordable interlace-to-progressive scan conversion method for TV receivers until in the 1990's, when single-chip motion compensated methods become feasible. Implicitly adaptive, nonlinear algorithms are still widely used even now, especially in the computer community.

Median filtering is by far the most popular example of implicitly adaptive methods. The simplest version is a Three-Tap VT Median Filter. The interpolated samples are found as the median luminance value of the vertical neighbors and the temporal neighbor in the previous field. The formal definition of this filter is given by:

$$F_o(x, y, t) = \begin{cases} F(x, y, t), & (y \bmod 2 = t \bmod 2) \\ med(F(x, y-1, t), F(x, y+1, t), F(x, y, t-1)), & \text{(otherwise)} \end{cases} \quad (1.4)$$

where med(A, B, C) is defined by:

$$med(A, B, C) = \begin{cases} A, & (B < A < C) \vee (C < A < B) \\ B, & (A \leq B \leq C) \vee (C \leq B \leq A) \\ C, & \text{(otherwise)} \end{cases} \quad (1.5)$$

(The formulae above can be generalized into any number of input values).

One of the attractive features of the median filter is its ability to preserve signal edges while suppressing impulse noise quite well. This is done by implicitly adapting to the motion or edges. The underlying assumption is that in case of stationarity, F(x, y, t) is likely to have a value between those of its vertical neighbors. Hence an inter-field (temporal) filtering is utilized. In case of motion, intra-field interpolation often results, since the correlation between the samples in the current field is likely to be the highest. Thus median filter automatically realizes intra/inter field switching on a pixel basis.

The median filter, however, exhibits some undesirable performance such as edge and plateau jitter for non-constant signal plus impulsive noise. Near the edge, the median filter allows bias error depending on the noise power and the height of signal edge. Applying smoothing prior to median filtering can limit this flaw.

The major drawback of median filtering is that it distorts vertical details and introduces alias. Hsu and Chen proposed a 2D Adaptive Separable Median Filter to reduce the alias (blocking) effect. This method is based on 1D adaptive median which can be defined as:

$$F_o(x, y, t) = \begin{cases} F(x, y, t), & (y \bmod 2 = t \bmod 2) \\ \displaystyle\sum_{i=M-d}^{M+d} \dfrac{\hat{x}_i}{(2d+1)}, & \text{(otherwise)} \end{cases}$$

where:

$$M = \dfrac{(N-1)}{2} \quad (1.6)$$

$$d = \begin{cases} 0, & (1 > M) \\ M - l, & (1 \leq M) \end{cases}$$

l is the distance between the position of the filter and that of blocking effects.

This algorithm was originally used for removing blocking effect in block-based image coding, but it can be easily adapted by giving l any specific value and combining this algorithm with a motion/edge detector. Despite all the disadvantages of the median filter, its superior properties at vertical edges and its low hardware cost have made it very successful.

Motion-adaptive methods use a motion detector algorithm to detect any movement inside the image. Based on the motion detector result, a filtering algorithm is used to convert the image from interlace to progressive. To detect the motion, the difference between two consecutive images is calculated. Normally this calculation is only done on the luminance data stream (the Y stream in the YUV format). Unfortunately, due to noise, the difference signal doesn't become zero in all parts of the picture that lack motion. Some systems have additional problems; for example, chrominance streams cause nonstationarities in color regions, interlace causes nonstationarities in vertical detail parts and timing jitter of the sampling clock is particularly harmful in horizontal detailed areas To overcome these problems it is desirable that the motion detector output should have a multilevel signal output rather than just a simple binary. The multilevel signal can be used to give more information about the motion characteristic. Because of all these difficulties with motion detection, providing a practical motion detector is not trivial. Assumptions are necessary to realize a practical motion detector that yields an adequate performance in most cases. Common assumptions to improve the detector include:

1. Noise is small and signal is large
2. The spectrum part of the chrominance streams carries no motion information
3. The low frequency energy in signal is larger than in noise and alias
4. Objects are large compared to a pixel.

A good motion detector must switch, or preferably fade, between two processing modes: one optimal for stationarity and the other for motion. An important aspect of designing a good motion-adaptive algorithm is determining the switching threshold or the fading function. Even with an adaptive switching/fading function, it is still difficult to make a function that can adapt to any kind of image.

Those skilled in the art will appreciate that temporal and vertical filters may be combined to reject alias components and preserve frequency domain by applying motion adaptive fading. Fading between an interpolator optimized for static image parts and one for moving images parts can be achieved with the following function:

$$F_o(x, y, t) = \begin{cases} F(x, y, t) & (y \bmod 2 = t \bmod 2) \\ \alpha f_{st}(x, y, t) + (1-\alpha)F_{mot}(x, y, t) & \text{(otherwise)} \end{cases} \quad (1.7)$$

With $F_{st}$ the result of interpolation for static image parts and $F_{mot}$ the result for moving image parts. The motion detector determines the mixed factor $\alpha$.

It has been suggest by some that a well defined VT filter can perform as well as the best motion adaptive filter at a lower price. The idea is that in order to prevent switching artifacts the fading results in something very similar to VT filtering that needs no motion detector.

Others have suggested a fade between more than two interpolators. For example, in certain interpolators the high frequency information for the interpolated line is extracted from the previous line, while a motion adaptive interpolator determines the low frequency information.

$$F_o(x, y, t) = \qquad (1.8)$$
$$\begin{cases} F(x, y, t) & (y \bmod 2 = t \bmod 2) \\ F_{HF}(x, y-1, t) + \alpha F_{av}(x, y, t) + (1-\alpha)F_{LF}(x, y, t-1), & \text{(otherwise)} \end{cases}$$

With $F_{HF}$ and $F_{LF}$ being the high pass and low pass filtered versions of input signal F. $F_{av}$ is defined by:

$$F_{av} = \frac{F_{LF}(x, y-1, t) + F_{LF}(x, y+1, t)}{2} \qquad (1.9)$$

With $\alpha$ controlled by the motion detector.

Another kind of motion detector is known as a "Mouse's Teeth Detector," schematically illustrated in FIGS. 5 and 6. This motion detector uses a spatial offset in the vertical direction to detect the motion. The computational complexity of the algorithm is very low and requires memory for only one field instead of an entire frame. The output of the detector has 8 level that can be used to better define a motion between the fields.

Another strategy for motion detection involves edge detection. Certain edge dependent methods use a larger neighborhood of samples in order to capture information about the edge orientation. If an intra-field interpolation is necessary because of motion, then the interpolation should preferably preserve the baseband spectrum. After determining the least harmful filter orientation, the signal is interpolated in that direction. As shown in FIG. 7, the interpolated sample X is determined by a luminance gradient indication which is calculated from its immediate neighborhood. The formal definition is given by:

$$X = \begin{cases} X_A, & ((|A-F| < |C-D|) \wedge (|A-F| < |B-E|)) \\ X_C, & (((|C-D| < |A-F|)) \wedge |C-D| < |B-E|)| \\ X_B, & \text{(otherwise)} \end{cases} \quad (1.10)$$

where XA, XB, XC are defined by:

$$X_A = \frac{A+F}{2}, X_B = \frac{B+E}{2}, X_C = \frac{C+D}{2}$$

and where the pixels A, B, C, D, E, and F are those indicated in FIG. 7, formally defined by:

$A=F(x-1,y-1,t)$ $B=F(x,y-1,t)$ $C=F(x+1,y-1,t)$ $D=F(x-1,y+1,t)$ $E=F(x+1,t)$ $F=F(x+1,y+t,t)$ $G=F(x,y-3,t)$ $H=F(x,y+3,t)$ in a certain methods, $X_B$ is replaced by a VT median filter.

It is uncertain whether a zero difference between pairs of neighboring samples indicates the spatial direction in which the signal is stationary. For example, noise—or more fundamentally, alias—can negatively influenced the decision. An edge detector can be applied to switch or fade between at least two processing modes, each of them optimal for interpolation for a certain orientation of the edge.

It is possible to increase the edge detection consistency by checking also the edge orientation at neighboring pixels. In certain methods, directional edge-detection operators are defined. For example, the error measurement for a vertical orientation is defined by:

$$\text{angle } 90° = |B-E| + |C-F| \qquad (1.11)$$

and for an edge under 116 degrees:

$$\text{angle } 116° = |A-E| + |B-F| \qquad (1.12)$$

Edge consistency information is further increased by looking for a dominating main direction in a near neighborhood. The problem of alias however, still remains.

Other methods of interpolation are hybrid methods, which mix linear and nonlinear methods. For example, in FIR Median hybrids, schematically illustrated in FIG. 8, first an 8-Tap VT filter is used. The output of the FIR filter is fed as one of the inputs of a five point median filter. The remaining four inputs are the nearest neighbors on the VT sampling grid.

Another kind of hybrid, the 9-Point Weighted Median, extends the aperture of median filter in the horizontal domain to enable implicit edge adaptation. It consist of 7 samples point, and the output of the median is defined by:

$$F_o(x, y, t) = \text{med}\left(A, B, C, D, E, F, \frac{B+E}{2}, F(x, y, t-1), F(x, y, t-1)\right) \quad (1.13)$$

where A, B, C, D, E, and F are the pixels as indicated in FIG. 7 and defined in equation 1.10.

Other methods extend this concept with a motion detector. For example, instead of using nine points, certain methods made the coefficient of ½(B+E) and F(x, y, t−1) adaptive. The motion detector controls the importance of the "weight" of these individual pixels at the input of the median filter. The output of the deinterlacer is defined by:

$$F_o(x, y, t) = \begin{cases} F(x, y, t), & (y\bmod 2 = t\bmod 2) \\ \text{med}\left(A, B, C, D, E, F, \alpha F(x, y, t-1), \beta\left(\frac{B+E}{2}\right)\right), & (\text{otherwise}) \end{cases} \quad (1.14)$$

where $\alpha$ and $\beta$ are the integer weights. $\alpha A$ indicates the number of A's that occur in equation 1.14. For example, 3A means A, A, A. A large value of $\alpha$ increases the probability of field insertion, whereas a large $\beta$ increases the probability of line averaging at the output.

Another combination of implicit/explicit edge and motion adaptivity uses a hierarchical three-level motion detector that provides indications of static, slow, and fast motion. Based on this analysis, one of three different interpolators is selected. In the case of static images, a temporal FIR filter is selected. In the case of slow motion, the so-called weighed hybrid median filter (WHMF) is used. And in the case of fast motion, a spatial FIR filter is used as the interpolator. Applying the definitions of FIG. 7 yields:

$$F_o = \begin{cases} F(x, y, t), & (y\bmod 2 = t\bmod 2) \quad (1.15) \\ \frac{1}{2}(F(x, y, t-1) + F(x, y, t+1)), & (\text{static}) \\ \text{med}\begin{pmatrix} \alpha_0 A + \frac{F}{2} \\ \alpha_1 B + \frac{E}{2} \\ \alpha_2 C + \frac{D}{2} \\ \alpha_3\left(\frac{G+H}{2}\right) \end{pmatrix}, & (\text{slow motion}) \\ c_0 B + c_1 E + c_2 G + c_3 H, & (\text{fast motion}) \end{cases}$$

The coefficients $\alpha_1$ are calculated according to Webers Law: "the eye is more sensitive to small luminance differences in dark area rather than in bright areas."

Motion compensated methods are the most advanced interlace-to-progressive scan conversion algorithms available. Similarly to many of the algorithms discussed above, motion compensated methods try to interpolate in the direction with the highest correlation. With motion vectors available, this is an interpolation along the trajectory of motion. Using the motion compensation, a moving sequence can virtually be converted into a stationary one. Thus, methods that perform better for static image parts will profit from motion compensation.

It is very easy to add a motion compensation in any of the algorithms described above. However, in the following paragraphs, attention will be given to new algorithms that cannot be deduced directly from the non-motion compensated algorithms. The common feature of these methods is that they provide a solution to the fundamental problem of motion compensating sub-sampled data. This problem arises if the motion vector used to modify coordinates of pixels in a neighboring field does not point to a pixel on the interlaced sampling grid. In the horizontal domain, this causes no serious problem, with the application of sampling rate conversion theory. In the vertical domain, however, the demands for applying the sampling theorem are not satisfied, prohibiting correct interpolation.

A first approximation to cope with this fundamental problem is to perform a spatial interpolation whenever the motion vector points at a nonexisting sample, or even to round to the nearest pixel.

Certain more sophisticated methods depart from this approximation. Before actually performing an intra-field interpolation, the motion vector is extended into the previous fields to check whether this extended vector arrives in the vicinity of an existing pixel. The formal definition is given by:

$$F_o(x, y, t) = \begin{cases} F(x, y, t), & (y\bmod 2 = t\bmod 2) \quad (1.16) \\ F(x - MV_x(x, y, t), y - MV_y(x, y, t) - \varepsilon_y, t-1), & ((y - MV_y - \varepsilon_y)\bmod 2 = t\bmod 2) \\ F(x, -2MV_x(x, y, t), y - MV_y(x, y, t) - 2\varepsilon_y, t-2), & ((y - 2MV_y - 2\varepsilon_y)\bmod 2 = t\bmod 2) \\ F(x - MV_x(x, y, t), y - MV_y(x, y, t), t-1), & (\text{otherwise}) \end{cases}$$

where $\epsilon_y$ is the small error resulting from rounding to the nearest grid position. $\epsilon_y$ has to be smaller than a threshold. If no motion compensated pixels appear in the vicinity of the required position it should be possible to find one even further backward in time. This is not recommended, however, as the motion vector loses validity by extending it too far.

The algorithm implicitly assumes uniform motion over a two-fields period, which is a drawback. Furthermore, the robustness to incorrect motion vectors is poor, since no protection is provided.

The Motion-compensated Time Recursive Algorithm came from the generalization of the fact that recursive filters have a lower implementation complexity than FIR filters. Even first-order linear recursive filters have infinite impulse response and produce output depending on the whole history of input. The Motion-compensated Time Recursive Algorithm uses a previously deinterlaced frame instead of the previous field. Once a perfectly deinterlaced image is available, and the motion vectors are accurate, sampling rate conversion theory can be used to interpolate the samples required to deinterlace the current field. The formal definition is given by:

$$F_o(x, y, t) = \begin{cases} F(x, y, t), & (y \bmod 2 = t \bmod 2) \\ F_o(x, -MV_x(x, y, t), y - MV_y(x, y, t), t-1), & \text{(otherwise)} \end{cases} \quad (1.17)$$

The initial condition $F_o(x, y, 0)$ is equal to $F(x, y, 0)$ where $F(x, y, t)$ is the output of a linear spatial interpolation.

As can be seen in FIG. 9, the interpolated samples generally depend on previous original samples as well as previously interpolated samples. Thus errors originating from one output frame can propagate into subsequent output frames. This is inherent to the recursive approach and is the worst drawback of this approach.

To prevent serious errors from propagating, the following algorithm has been proposed:

$$F_o(x, y, t) = \begin{cases} F(x, y, t), & (y \bmod 2 = t \bmod 2) \\ (1-c)\hat{F}(x, y, t) + \\ cF_o(x, -MV_x(x, y, t), y - MV_y(x, y, t), t-1), & \text{(otherwise)} \end{cases} \quad (1.18)$$

Aliasing at the output of the deinterlaced results in nonstationarity along the motion trajectory. Such nonstationarities can be suppressed using a filter. Cost effective filtering in the spatial, temporal, or spatio-temporal domain can best be realized with a recursive filter.

Certain methods extended the idea of the time recursive algorithm and proposed a motion-compensated first-order recursive temporal filter given by:

$$F_o(x, y, t) = \quad (1.19)$$
$$\begin{cases} kF(x, y, t) + (1-k)F_o(x - MV_x(x, y, t), y - MV_y(x, y, t), t-1), & (y \bmod 2 = t \bmod 2) \\ pF_i(x, y, t) + (1-p)F_o(x, -MV_x(x, y, t), y - MV_y(x, y, t), t-1), & \text{(otherwise)} \end{cases}$$

where p and k are adaptive parameters and $F_I$, is the output of any initial interlace-to-progressive Conversion algorithm. Preferably a simple method is used, such as line averaging. The derivation of k is fairly straightforward and is comparable to what we see in edge preserving recursive filters, which are used for motion-adaptive noise reduction.

A similar derivation for p is not obvious, since the difference would heavily depend upon the quality of the initial deinterlacer. To solve this problem, the factor p is selected such that the nonstationarity along the motion trajectory of the resulting output for interpolated pixels equals that of the vertically neighboring original pixels. This assumption leads to:

$$p(x, y, t) = \frac{|A + B| + \delta}{2|F_i(x, y, t) - F_o(x, -MV_x(x, y, t), y - MV_y(x, y, t), t-1)| + \delta} \quad (1.19)$$

where:

$A = F_o(x, y-1, t) - F_o(x - MV_x(x, y, t), y - MV_y(x, y, t) - 1, t-1)$ $B = F_o(x, y+1, t) - F_o(x, -MV_x(x, y, t), y - MV_y(x, y, t) + 1, t-1)$ and where δ is a small constant, to prevent division by zero.

The recursion is an essential ingredient of the concept. Consequently, the adaptive-recursive approach, similar to the time-recursive approach, has the risk of error propagation as its main disadvantage.

As can be seen from the discussion above, motion estimation is used to improve the accuracy of the prediction of lines in interlaced-to progressive scan conversion. (Motion estimation also has various applications in the image, video processing, and computer vision or robotics area.) Linear or temporal interpolators are perfect in the absence of motion, but in the presence of motion, especially multiple motions in one frame, motion estimation is essential in order to have a good prediction of the missing lines.

In general, motion estimation can be divided into three categories: (1) Pixel-by-pixel motion estimation (sometimes called "pel-recursive algorithms," or "PRAs"); (2) Block-by-block motion estimation (commonly called "block matching algorithms," or "BMAs"; and (3) advanced motion estimation methods.

Pel-recursive algorithms have rarely been used because they are inherently complex and quite difficult to implement. Another problem with PRAs is that the motion estimation algorithms sometimes run into convergence problems.

One well-known PRA is gradient matching. FIG. 10 illustrates the principle of gradient matching. At a given point in a picture, the function of brightness with respect to distance across the screen will have a certain slope, known as the spatial luminance gradient. If the associated picture area is moving, the slope will traverse a fixed point on the screen and the result will be that the brightness now changes with respect to time. For a given spatial gradient, the temporal gradient becomes steeper as the speed of movement increases. Thus motion speed can be estimated from the ratio of the spatial and temporal gradients.

In practice this is difficult because there are numerous processes which can change the luminance gradient. When an object moves so as to obscure or reveal the background, the spatial gradient will change from field to field even if the motion is constant. Various illuminations, such as when an object moves into shade, also cause difficulty. The process can be assisted by recursion, in which the motion is estimated over a larger number of fields, but this will result in problems directly after a scene change.

Phase correlation is another kind of PRA. A block diagram of a basic phase correlator is provided in FIG. 11. A phase correlator works by performing a discrete Fourier transform on two successive fields and then subtracting all of the phases of the spectral components. The phase differences are then subject to a reverse transform which directly reveals peaks whose positions correspond to motions between the fields. The nature of the transform domain means that if the distance and the direction of the motion are measured accurately, the area of the screen in which they took place is not. Thus in practical systems the phase correlation stage is followed by a matching stage not dissimilar to the block matching process. However, the matching process is steered by the motions from the phase correlation, and so there is no need to attempt to match at all possible motions. The similarities between the two from the practical perspective causes some people think of phase correlation as another branch of block matching.

One way of considering phase correlation is to think of the Fourier transform as breaking the picture into its constituent spatial frequencies. The hierarchical structure of block matching at various resolutions is in fact performed in parallel. In this way small objects are not missed because they will generate high-frequency components in the transform.

Although the matching process is simplified by adopting phase correlation, the Fourier transforms themselves require complex calculations. The high performance of phase correlation would remain academic because it's too difficult to implement, were it not for an important assumption about the range of motion speeds. When realistic values are used for the motion speed the computation required by block matching actually exceeds that required for phase correlation. FIG. 12 provides a block diagram of a practical phase correlated motion estimator.

The elimination of amplitude information from the phase correlation process ensures that motion estimation continues to work in the case of fades, objects moving into shade, or flashgun firings.

Block matching is the simplest approach to motion compensation. Even though it is not optimal, it has been widely used, and is the preferred technique in inter-frame motion compensated (MC) hybrid coding, interlace-to-progressive scan conversion, and other video/image processing related areas. The reason for this is the ease of implementation, because it doesn't require complicated circuitry. The idea of block matching, as illustrated in FIG. 13, is to calculate motion of a block of pixels by comparing it within a frame or field. Normally the search is constrained to searching within a specific window.

In block matching motion estimation algorithms a displacement/motion vector (MV) is assigned to the center of a block pixel B(x, y, t) in the current field t. If you assume that the block is M×N pixel size, B(x, y, t) can be described as:

$$B(x,y,t) = \lfloor \{(x,y) | X_x - N/2 \leq x \leq X_x + N/2 \wedge X_y - M/2 \leq y \leq X_y + M/2\}, t \rfloor \quad (1.20)$$

Where $X = (X_x, X_y)^T$ is the center of B(x, y, t).

The motion vector MV (x,y,t) is determined by comparing the present field block with the previous field. The goal is to find the best match or least distorted block from the previous field. The best matched block has a center, which is shifted with respect to X over the motion MV (x,y,t).

It's desirable to compare all the possible positions to get the optimal MV. However this is impractical and it requires a lot of overhead processing. In order to make it practical to implement, the search is constrained within a specific window, which is centered at X.

The window can be specified as:

$$W(x, y, t-1) = \left[\left\{(x, y) \| x | \leq \frac{N}{2} + n1 \wedge |y| \leq \frac{M}{2} + m2\right\}, t-1\right] \quad (1.21)$$

The window is illustrated in FIG. 14 [2.15].

In most cases it's nearly impossible to get a similar block from the previous field. The motion vector MV (x,y,t) resulting from the block-matching process is a candidate vector C which yields the minimum value of an error function e(C, X, t). S is defined as the set of all possible C within MV (x,y,t-1).

$$S = \{\overline{C} \| C_x | \leq n1 \wedge | C_y | \leq m2\} \quad (1.22)$$

$$\overline{MV}(x, y, t) \in \{\overline{C} \in S | e(\overline{C}, \overline{X}, t) \leq e(\overline{F}, \overline{X}, t) \forall \overline{F} \in S\}$$

Assuming that all the pixels in B(x, y, t) have the same motion, then MV (x,y,t) with the smallest matching error is assigned to all pixel positions of B(x, y, t):

$$\forall (x,y) \in B(x,y,t) \colon \overline{MV}(x,y,t) \in \{\overline{C} \in S | e(\overline{C}, \overline{X}, t) \leq e(\overline{F}, \overline{X}, t) \forall \overline{F} \in S\} \quad (1.23)$$

The error value for a given candidate vector C is a function of the luminance values of the pixels in the current block B(x,y,t) and those of the shifted block from the previous field, summed over the block B(x,y,t). Methods to calculate e(C, X, t) include:

Mean absolute Error (MAE) or Sum of the absolute Differences (SAD):

$$M_1(i, j) = \frac{1}{MN} \sum_{p=1}^{N} \sum_{q=1}^{M} | (X_{p,q}, n) - (X_{p+i,q+j}, n-1)|, \quad (1.24)$$

$$|i| \leq n1, |j| \leq m2$$

Mean Square Error (MSE):

$$M_2(i, j) = \frac{1}{MN} \sum_{p=1}^{N} \sum_{q=1}^{M} ((X_{p,q}, n) - (X_{p+i,q+j}, n-1))^2, \quad (1.25)$$

$$|i| \leq n1, |j| \leq m2$$

Cross-correlation Function:

$$M_3(i, j) = \frac{\sum_{p=1}^{N} \sum_{q=1}^{M} (X_{p,q}, n)(X_{p+i,q+j}, n-1)}{\left[\sum_{p=1}^{N} \sum_{q=1}^{M} (X_{p,q}, n)^2\right]^{1/2} \left[\sum_{p=1}^{N} \sum_{q=1}^{M} (X_{p+i,q+j}, n-1)^2\right]^{1/2}}, \quad (1.26)$$

$$|i| \leq n1, |j| \leq m2$$

Mean Absolute Error is presently the most commonly implemented method on ICs, since it permits the simplest circuitry. In several simulations Mean Absolute Error performs as well as Mean Square Error. The Cross-correlation is the best method in the sense that it produce less error, but it requires a lot of computation, which makes it impractical to implement.

Block Matching Algorithm techniques depend upon several assumptions:

(1). No rotational motion occurs inside the block (2) Objects have inertia (3) The window is sufficiently large to capture the motion from frame to frame The consequence of assumptions 1 and 2 is that the MV (xy,t) that assign to X is applied to all the pixels in the blocks. Also B(x,y,t) should be small enough so that in cases where there is a rotational motion of an object in a frame, it can be translate into straight vector MV (x,y,t) at the block level.

Another thing that should be considered is the window size. If the window is not big enough, there is a chance that the MV (x,y,t) that we get is not optimal, especially in the case of a very fast moving objects.

Conceptually, the simplest approach to block matching is brute-force, or full search block matching. This approach involves searching every possible position. This gives the global optima, but at the expense of extensive computation. The magnitude of the computational load is exacerbated by the need to extend motion estimation to sub-pixel accuracy. As shown in FIG. 15 the increase in potential match loci for even half-pixel accuracy involves a quadrupling of the number of possible solutions that must be searched. A motion vector resolution of ¼ pixel accuracy is normally considered as a near true-motion vector field.

Though brute search BMAs give a global optima result, it requires more complex circuitry or more time to process. Most of the motion estimation ICs right now implement a full search algorithm. The complex circuitry makes the price of these ICs impractical for most applications. It's desirable to have an affordable consumer IC for motion estimation. In some applications, a local optima solution is sufficient. This has led to development of more efficient motion estimation approaches, which test only a subset of candidate vectors.

One of these approaches is conjugate direction searching (CDS). One-at-a-time searching (OTS) is a simplified version of conjugate direction search. OTS tracks the motion alternately horizontally and vertically, as shown in FIG. 16. A modified and improved version of this approach, one-dimensional full search motion estimation, has recently been developed.

Another block searching strategy is logarithmic searching. Logarithmic searching was the first simplified search strategy published. The logarithmic search tracks block motion along the direction of minimum distortion, as illustrated in FIG. 17.

Yet another block searching strategy is three-step searching, illustrated in FIG. 18. This is a fine-coarse search mechanism. At each step, the algorithm calculates and compares 9 points. Assuming that the center for the first step is $X=(X_x, X_y)^T$, the algorithm for each step can be described as:

$$(\overline{X'}, t) = \{\overline{C} \in S | e(\overline{C}, t) \leq e(\overline{F}, t) \forall F \in S\} \quad (1.27)$$

where $(\overline{X'}, t)$ is the new center point $\overline{C}$: candidate point $\epsilon\{\overline{X} + a\overline{U}_i\}$ $$\overline{U}_i = \left\{ \begin{pmatrix} 0 \\ 0 \end{pmatrix}, \begin{pmatrix} 0 \\ 1 \end{pmatrix}, \begin{pmatrix} 1 \\ 1 \end{pmatrix}, \begin{pmatrix} 1 \\ 0 \end{pmatrix}, \begin{pmatrix} 1 \\ -1 \end{pmatrix}, \begin{pmatrix} 0 \\ -1 \end{pmatrix}, \begin{pmatrix} -1 \\ -1 \end{pmatrix}, \begin{pmatrix} -1 \\ 0 \end{pmatrix}, \begin{pmatrix} -1 \\ 1 \end{pmatrix} \right\}$$

$$a = \begin{cases} 4; & \text{for step I} \\ 2; & \text{for step II} \\ 1; & \text{for step III} \end{cases}$$

e(C,t) and e(F,t) is error from the corresponding points. And the motion vector:

$$\overline{MV}(x,y,t) = (\overline{X'''}, t) - (\overline{X}, t) \quad (1.27)$$

$\overline{X'''}$ is the center point after the $3^{rd}$ step.

Still another strategy for block searching is hierarchical searching. A block diagram of a hierarchical searching algorithm is illustrated in FIG. 19. This process involves decimating (sub-sampling) the present image and the reference image successively both horizontally and vertically. The search process starts with the lowest resolution images, using a small block size. The motion vector estimated at the first stage is used as the starting points for motion estimation at the next stage. Note that block size is now doubled along both directions. This process is repeated until the original resolution images are reach. The HDTV codec propose by Zenith and AT&T uses hierarchical searching for motion estimation Another block search strategy is 3D recursive search motion estimation. The concept of this method is to store all the information of the motion vectors (MV) from the previous field and use that as a comparison to predict the new motion vector from the current field. At the top of the field, the prediction only involves the temporal neighboring motion vector. After the top motion vectors of the current field have been found, the prediction involves both the spatial and temporal neighboring motion vectors.

This algorithm tries to overcome the problem of one-dimensional recursive searching and tries to focus on the smoothness of the motion vectors. In one-dimensional recursive searching, like one-at-a-time searching, the resulting smoothness of these algorithms is insufficient. This is assumed to be caused by a large number of evaluated candidate vectors located around the spatial or temporal prediction value. This can cause strong deviation from the prediction, like inconsistencies in the velocity field, as the vector selection criterion applied in block matching (minimum match error) cannot guarantee returning true motion vectors. The fundamental difficulty with a one-dimensionally recursive algorithm is that it cannot cope with discontinuities in the velocity plane.

Certain 3D recursive search algorithms make the assumption that the discontinuities in the velocity plane are spaced at a distance that enables convergence of the recursive block matcher between two discontinuities. The recursive block matcher yields the correct vector value at the first side of the object boundary and starts converging at the opposite side. The convergence direction here points from side one to side two. Either side of the contour can be estimated correctly, depending on the convergence direction chosen, though not both simultaneously. Based on this, two estimators are applied concurrently, as indicated in FIG. 20, with opposite convergence directions. A mean absolute error criterion is used to decide which of these two estimators yields the correct displacement vector at the output.

This bidirectional convergence is hereinafter referred to as 2-D Convergence. The process is formally defined by:

$$\forall (x, y) \in B(x, y, t) : \overline{MV}(x, y, t) = \begin{cases} \overline{MV}_a(x, y, t), & (e(\overline{MV}_a, \overline{X}, t) \leq e(\overline{MV}_b, \overline{X}, t)) \\ \overline{MV}_b(x, y, t), & (e(\overline{MV}_a, \overline{X}, t) \geq e(\overline{MV}_b, \overline{X}, t)) \end{cases} \quad (1.28)$$

-continued where:

$$e(\overline{MV}_a, \overline{X}, t) = \sum_{x \in B(x,y,t)} |F(x, y, t) - F(x - MV_{ax}, y - MV_{ay}, t - T)|$$

$$e(\overline{MV}_b, \overline{X}, t) = \sum_{x \in B(x,y,t)} |F(x, y, t) - F(x - MV_{bx}, y - MV_{by}, t - T)|$$

$MV_a$ and $MV_b$ are found in a spatial recursive process and can be calculated using equations 1.22 and 1.23. The updating prediction vectors $S_a$ (x, y, t) are given by:

$$\overline{S}_a(x, y, t) = \overline{MV}_a(\overline{X} - \overline{SMV}_a, t) \quad (1.29)$$

$$\overline{X}_b(x, y, t) = \overline{MV}_b(\overline{X} - \overline{SMV}_b, t) \quad (1.30)$$

where:

$$\overline{SMV}_a \neq \overline{SMV}_b \quad (1.31)$$

and where SMV points from the center of the block from which the prediction vector is taken to the center of the current block.

As indicated in condition 1.31, the two estimators have unequal spatial recursion vectors. If the two convergence directions are opposite (or at least different), the 2-D Convergence solves the run-in problem at the boundaries of moving objects. This is because one of the estimators will have converged already at the position where the other is yet to do so. Hence the concept combines the consistent velocity field of a recursive process with the fast step response as required at the contours of moving objects. The attractiveness of a convergence direction varies significantly for hardware. Referring to FIG. 21, the predictions taken from blocks 1, 2, or 3 are convenient for hardware and blocks 6, 7, 8 are totally unattractive.

The 3D Recursive approach extends the concept of the 2-D Convergence by adding convergence accelerators (CA), which are taken from the temporal neighboring prediction vectors. The spatial predictions are selected to yield two perpendicular diagonal convergence axes, as given by the following equations, and illustrated in FIG. 22.

$$\overline{S}_a(x, y, t) = \overline{MV}_a\left(\overline{X} - \begin{pmatrix} X \\ Y \end{pmatrix}, t\right) \quad (1.32)$$

$$\overline{S}_b(x, y, t) = \overline{MV}_b\left(\overline{X} - \begin{pmatrix} -X \\ Y \end{pmatrix}, t\right)$$

The Convergence Accelerator (CA) is another estimator that is selected along the convergence direction of each original estimator. To cope with the casuality, instead of introducing new estimators c and d, it uses a temporal neighboring motion vector from the previous field ($T_a$, and and $T_b$ for estimators a and b respectively). The concept is that the new candidate in each original estimator accelerates the convergence of the individual estimator by introducing a look ahead into the convergence direction. These convergence accelerators are not taken from the corresponding block in the previous field, but from a block shifted diagonally over r blocks and opposite to the blocks which the spatial predictions S7a and S7b.

$$\overline{T}_a(x,y,t) = \overline{MV}(x+r \cdot X, y+r \cdot Y, t-T)$$

$$\overline{T}_b(x,y,t) = \overline{MV}(x+r \cdot -X, y+r \cdot Y, t-T) \quad (1.33)$$

Increasing r implies a larger look ahead, but the reliability of the prediction decreases correspondingly, as the correlation between the vectors in a velocity plane can be expected to drop with increasing distance. r=2 has been experimentally found to the best for a block size of 8*8 pixels. The resulting relative positions are drawn in FIG. 23.

For the resulting 3D RS block matching algorithm, the motion vector MV(x, y, t) is calculated according to equation 1.28, where $MV_a(x,y,t)$ and $MV_b(x,y,t)$ result from estimators a and b respectively, and are taken from a candidate set CS. The motion vector range is limited to $CS^{max}$ (which is the search window defined in 1.28) and the proposed candidate set $CS_a$ (x,y,t) for estimator a applying this updating strategy, hereinafter referred to as asynchronous cyclic search (ACS), defined as:

$$CS_a(x, y, t) = \quad (1.34)$$

$$\{\overline{C} \in CS^{max} | \overline{C} = \overline{MV}_a(x - X, y - Y, t) + \overline{U}_a(x, y, t)\} \cup$$

$$\{\overline{MV}(x + 2X, y + 2Y, t - T), 0\}$$

where:

$$\overline{U}_a(x,y,t) \in \{0, lut(N_{bl}(x,y,t) \bmod p)\}$$

where Nbl is the output of a block counter, lut is a look up table function, and p is a number which not a factor of the number of blocks in the picture (preferably a prime number).

The candidate set for b is given by $$CS_b(x, y, t) = \quad (1.35)$$

$$\{\overline{C} \in CS^{max} | \overline{C} = \overline{MV}_b(x - X, y + Y, t) + \overline{U}_b(x, y, t)\} \cup$$

$$\{\overline{MV}(x - 2X, y + 2Y, t - T), 0\}$$

where:

$$\overline{U}_b(x, y, t) \in \{0, lut((N_{bl}(x, y, t) + \text{offset}) \bmod p)\}$$

$U_b(x,y,t)$ differs from $U_a(x,y,t)$ due to integer offset added to the value of the block rate counter. The estimators a and b are chosen from candidate set to minimize the matching error:

$$e(\overline{C}, x, y, t) = \sum_{x \in B(x,y,t)} |F(x, y, t) - F(x - C_x, y - C_y, t - T)| \quad (1.36)$$

where the matching error is summed over a block B(x,y,t), defined as:

$$B(x,y,t) = \{(x,y) | X_x - X/2 \leq x \leq X_x + X/2 \wedge X_y - Y/2 \leq y \leq X_y + Y/2\} \quad (1.37)$$

The best of two vectors resulting from estimators a and b is selected in the output multiplexer and assigned to all pixels in B(x,y,t). Good results are obtained from estimators using the ACS strategy where the lut (look up table) containes the following updates:

$$US_n = \left\{ \binom{0}{0}, \binom{0}{1}, \binom{0}{-1}, \binom{0}{2}, \binom{0}{-2}, \binom{1}{0}, \binom{-1}{0}, \binom{3}{0}, \binom{-3}{0} \right\} \quad (1.38)$$

Thus, a new system and method for interlace-to-progressive scan conversion are needed, which implement a new algorithm by an electronic consumer Video Display Processor Chip. The present invention is directed towards meeting this need, among others.

SUMMARY OF THE INVENTION

A first embodiment interlace-to-progressive scan conversion system according to the present invention comprises: a prefilter having a prefiltered signal as an output; a motion estimator having the prefiltered signal as input and a motion-corrected signal as an output; and an adaptive filter having the prefiltered signal and the motion-corrected signal as inputs.

A second embodiment interlace-to-progressive scan conversion system according to the present invention comprises: a spatial line averaging prefilter having a prefiltered signal as an output; a motion estimator; and a three-stage adaptive recursive filter. The motion estimator has the prefiltered signal as input and a motion-corrected signal as an output. The motion estimator comprises: a 3-D recursive search sub-component; a motion vector correction sub-component; and a block erosion sub-component. The three-stage adaptive recursive filter has the prefiltered output and the motion corrected output as inputs. The three-stage adaptive recursive filter comprises: a first stage comprises a function that selects between using static pixels data and moving pixels data from a next field; a second stage comprises a function that selects a more valid set of data between motion compensated data from a previous field and the pixels selected by the first stage; and a third stage comprises a function that combines an intra-field interpolation with the more valid set of data selected by the second stage.

A third embodiment interlace-to-progressive scan conversion system according to the present invention comprises: a spatial line averaging prefilter having a prefiltered signal as an output; a motion estimator having the prefiltered signal as input and a motion-corrected signal as an output; and a three-stage adaptive recursive filter having the prefiltered signal and the motion-corrected signal as inputs. The motion estimator comprises: a 3-D recursive search sub-component having a bilinear interpolator; a motion vector correction sub-component having an error function, the error function including penalties related to a length of the difference vector between a given candidate vector and a plurality of neighboring vectors; and a block erosion sub-component. The motion estimator assumes that a motion vector for an object between a previous field and a current field is the same as a motion vector for the object between the current field and a next field. The three-stage adaptive recursive filter comprises: a first stage comprises a function that selects between using static pixels data and moving pixels data from a next field; a second stage comprises a function that selects a more valid set of data between motion compensated data from a previous field and the pixels selected by the first stage; and a third stage comprises a function that combines an intra-field interpolation with the more valid set of data selected by the second stage.

In a fourth embodiment, the invention provides a method for converting an interlaced image to a progressive scan image, the method comprising: providing an input signal corresponding to an image; prefiltering the input signal with a spatial line averaging prefilter; estimating motion in the image by performing a 3-D recursive search, performing a motion vector correction, and performing a block erosion to reduce blockiness in the progressive scan image; and filtering the signal in three stages. In the first stage selecting between using static pixels data and moving pixels data from a next field. In the second stage selecting a more valid set of data between motion compensated data from a previous field and the pixels selected by the first stage. In the third stage combining an intra-field interpolation with the more valid set of data selected by the second stage.

In a fifth embodiment, the invention provides a method for converting an interlaced image to a progressive scan image, the method comprising: providing an input signal corresponding to an image; prefiltering the input signal with a spatial line averaging prefilter; estimating motion in the image; and filtering the signal in three stages. The estimation of motion is performed by: assuming that a motion vector for an object between a previous field and a current field is the same as a motion vector for the object between the current field and a next field; performing a 3-D recursive search; performing a motion vector correction in which the error function penalizes a candidate vector based on a length of a difference vector between the candidate vector and a plurality of neighboring vectors; performing a block erosion to reduce blockiness in the progressive scan image. The three-stage filtering is performed by: in the first stage selecting between using static pixels data and moving pixels data from a next field; in the second stage selecting a more valid set of data between motion compensated data from a previous field and the pixels selected by the first stage; and in the third stage combining an intra-field interpolation with the more valid set of data selected by the second stage.

BRIEF DESCRIPTION OF THE DRAWINGS

FIG. 1 is an illustration of the interlace-to-progressive scan conversion, or deinterlacing, task.

FIG. 4 is a graph of the required frequency characteristic in the video spectrum for an interlace-to-progressive scan conversion.

FIG. 5 is a block diagram of a Mouse's Teeth detector.

DETAILED DESCRIPTION OF THE PREFERRED EMBODIMENT

For the purposes of promoting an understanding of the principles of the invention, reference will now be made to preferred embodiments and specific language will be used to describe the same. It will nevertheless be understood that no limitation of the scope of the invention is thereby intended. Such alternations and further modifications in the invention, and such further applications of the principles of the invention as described herein as would normally occur to one skilled in the art to which the invention pertains are contemplated, and desired to be protected.

Figure 2A:
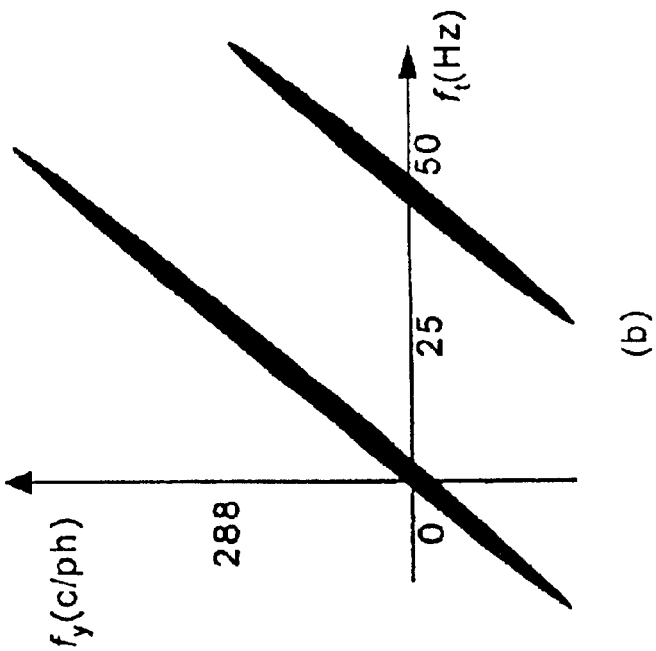
FIGS. 2a and 2b illustrate the change in orientation of the vertical-temporal video spectrum caused by vertical motion.
Figure 2B:
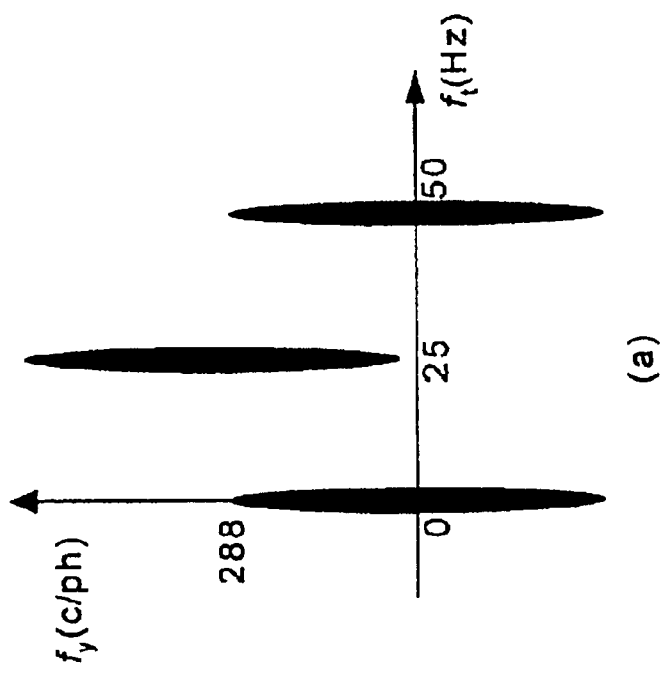
Figure 3A:
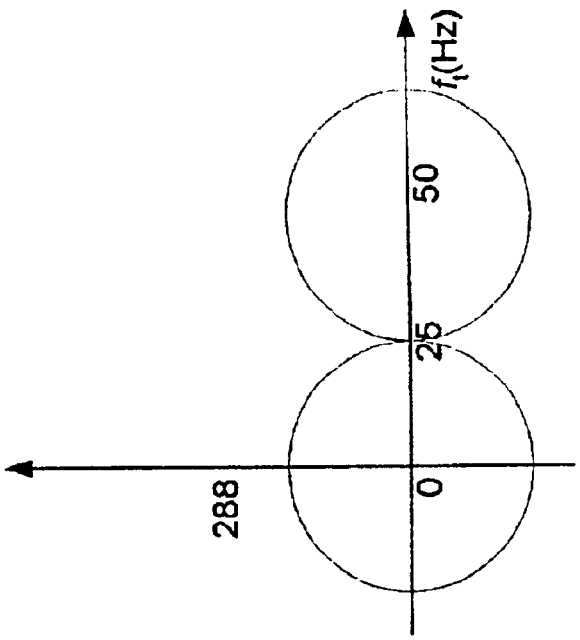
FIG. 3a illustrate the general spectrum for an interlaced signal with motion.
Figure 3B:
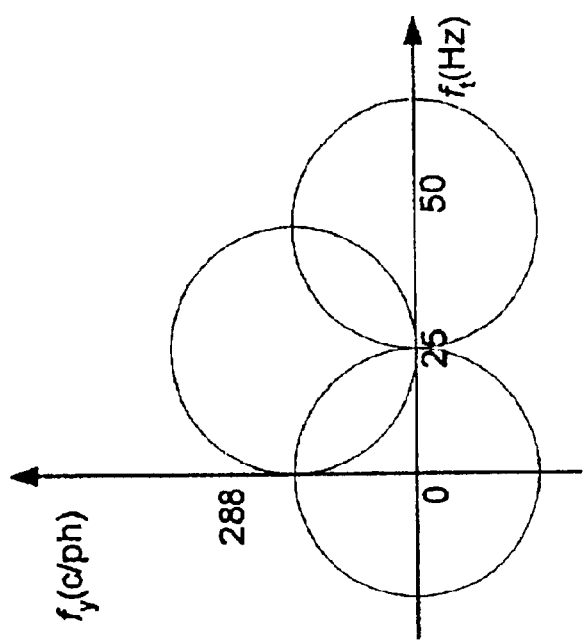
FIG. 3b illustrated the ideal spectrum result from an interlace-to-progressive scan conversion process.
Figure 6:
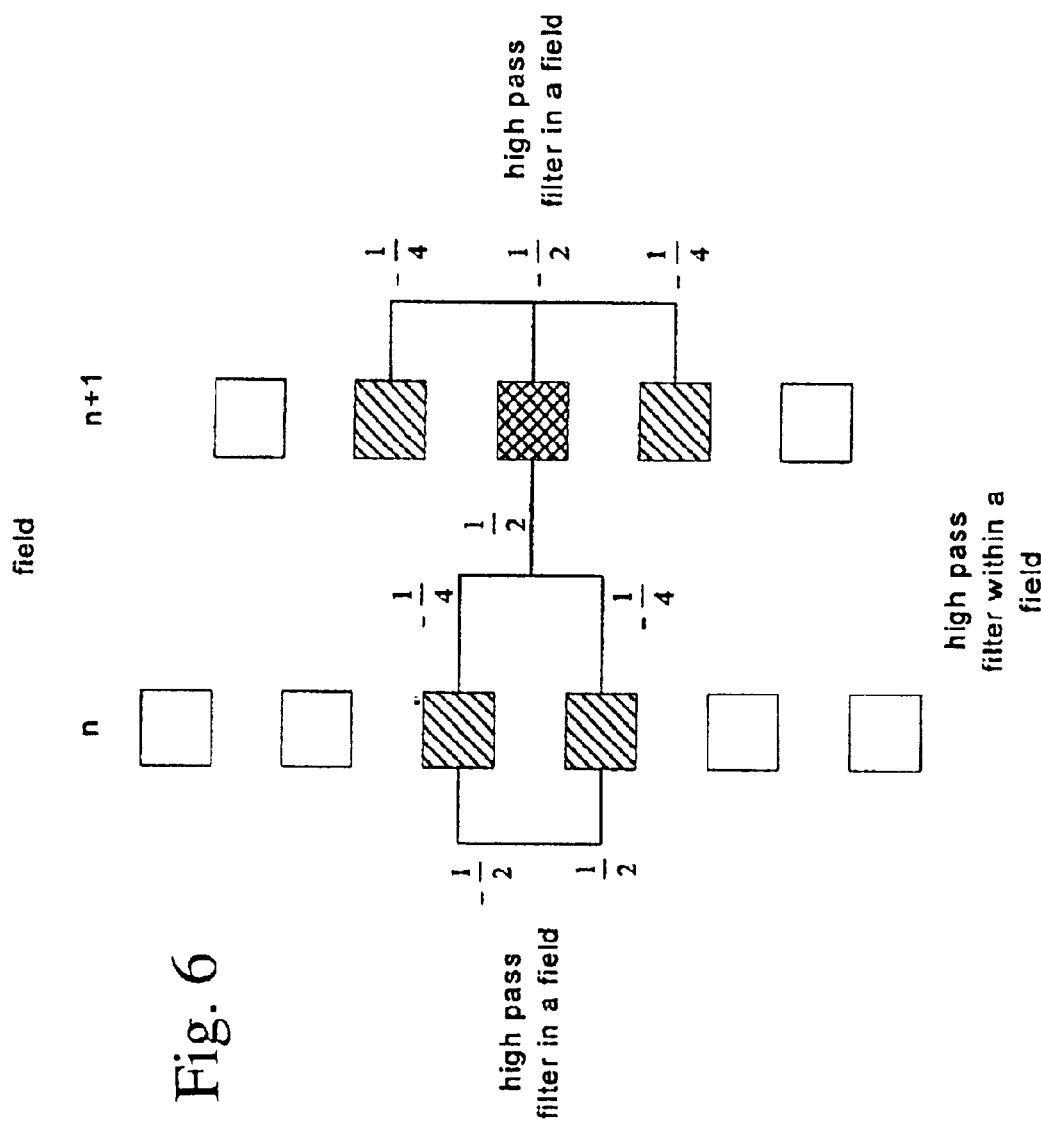
FIG. 6 is diagram of the coefficients of the vertical high pass filters used with a Mouse's Teeth detector.
Figure 7:
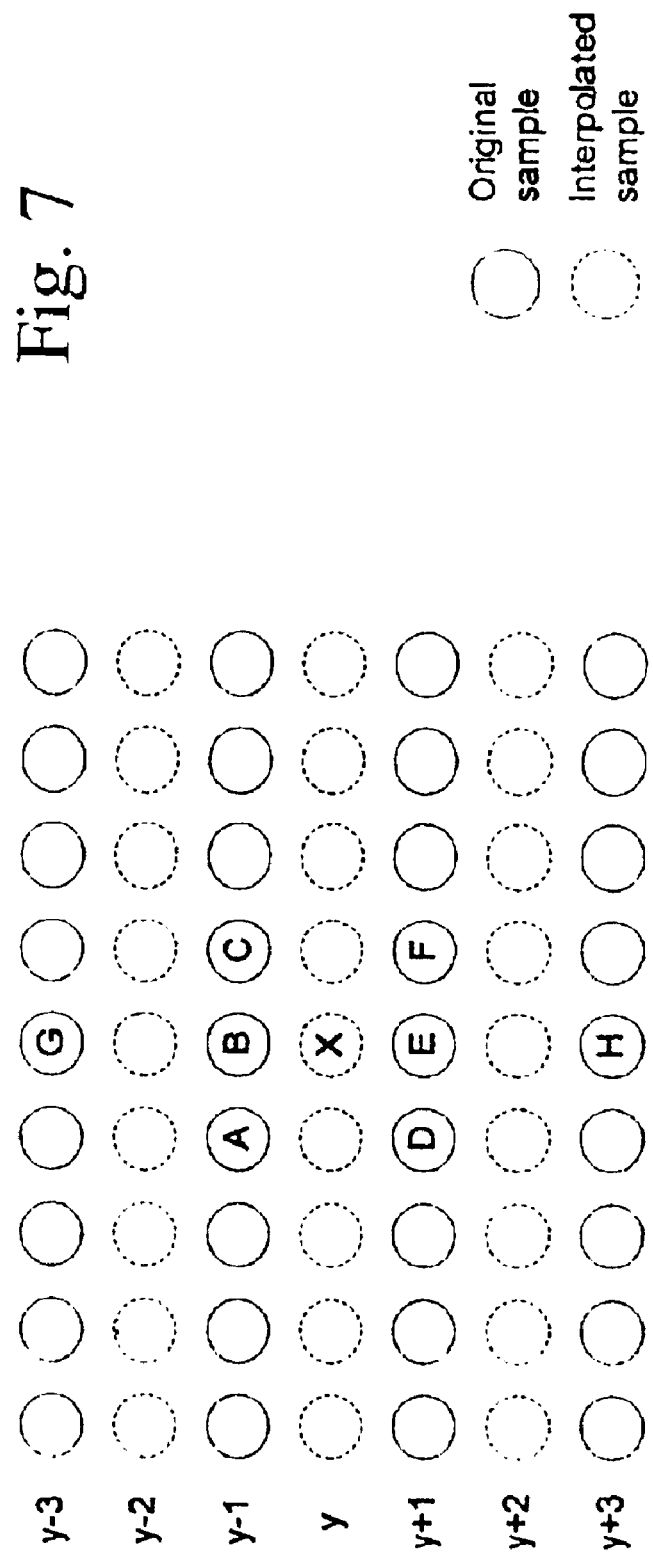
FIG. 7 is a diagram of pixels in an image to be converted from interlace to progressive scan.
Figure 8:
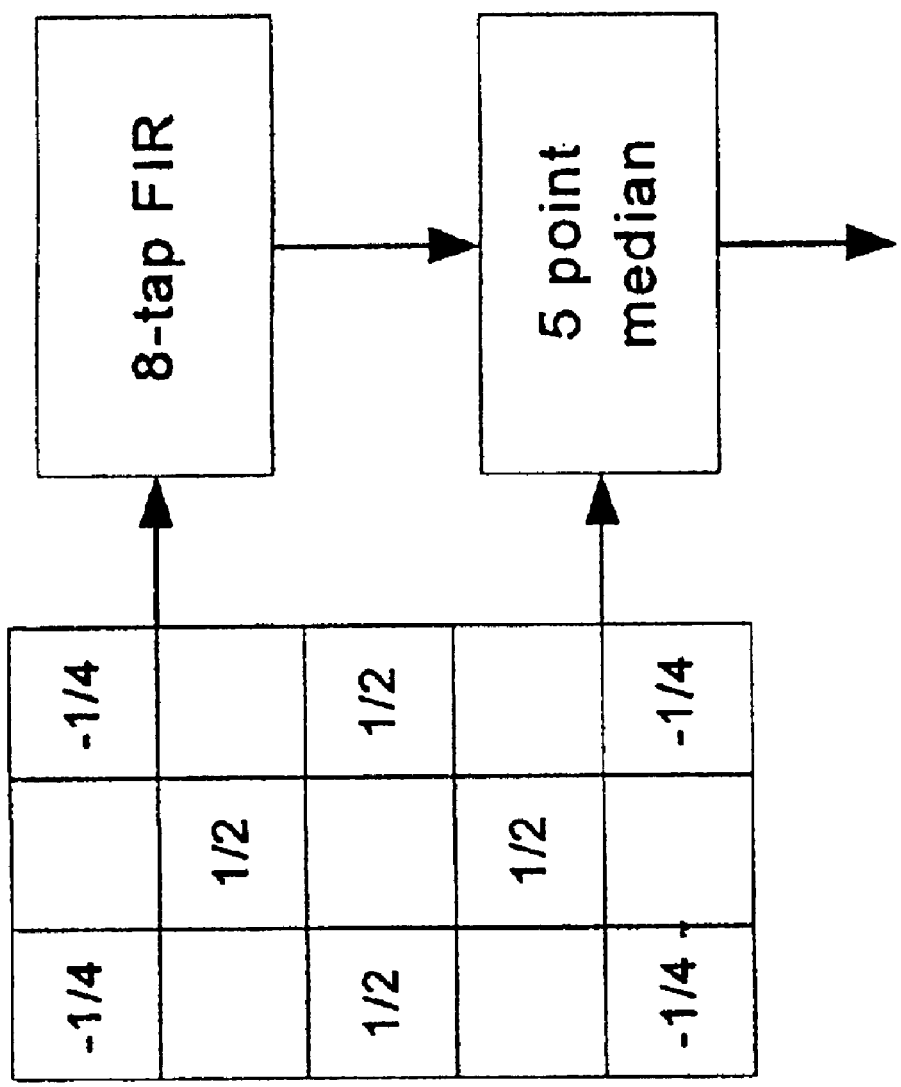
FIG. 8 is a block diagram of an FIR Median Hybrid filter.
Figure 9:
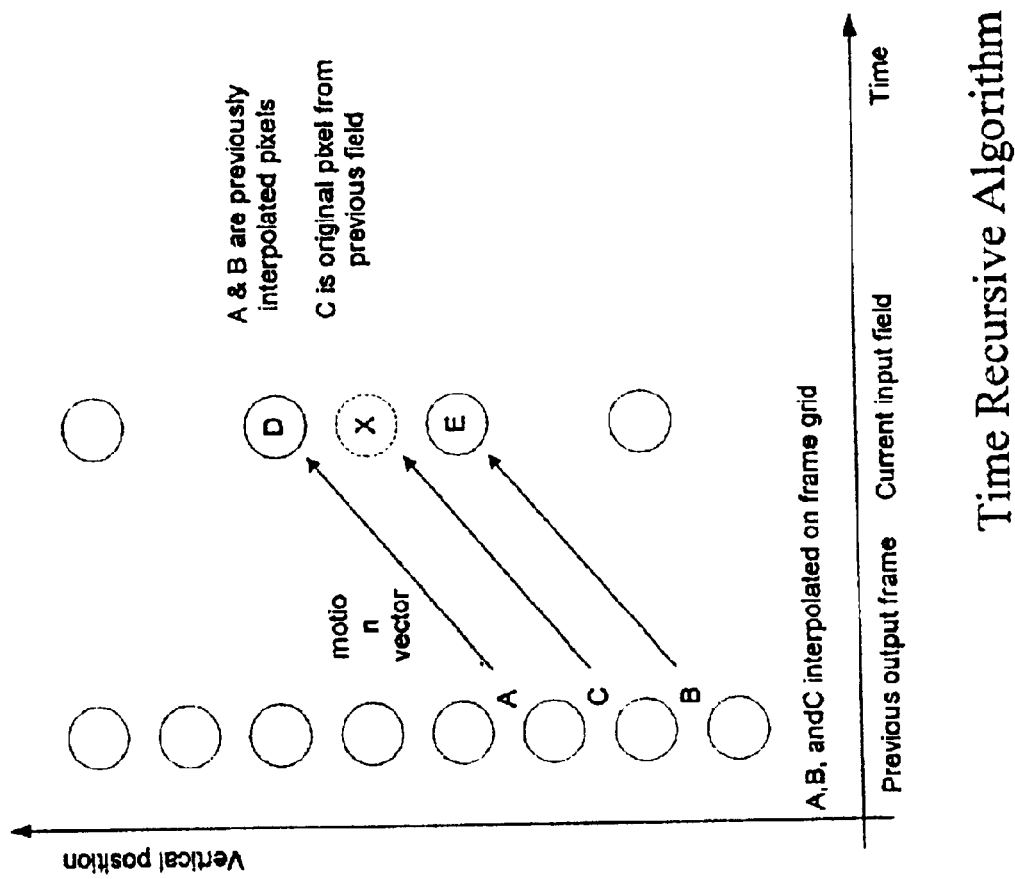
FIG. 9 is a diagram of a time recursive function.
Figure 10:
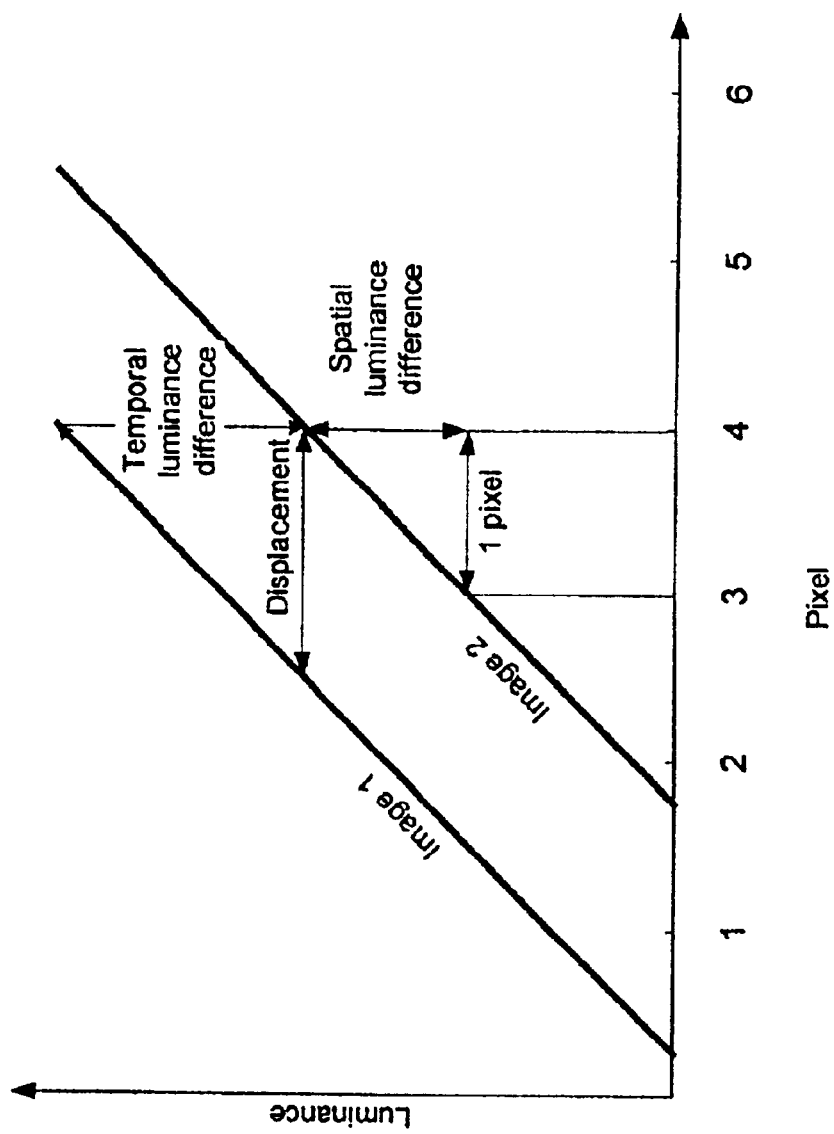
FIG. 10 is an illustration of a gradient matching process.
Figure 11:
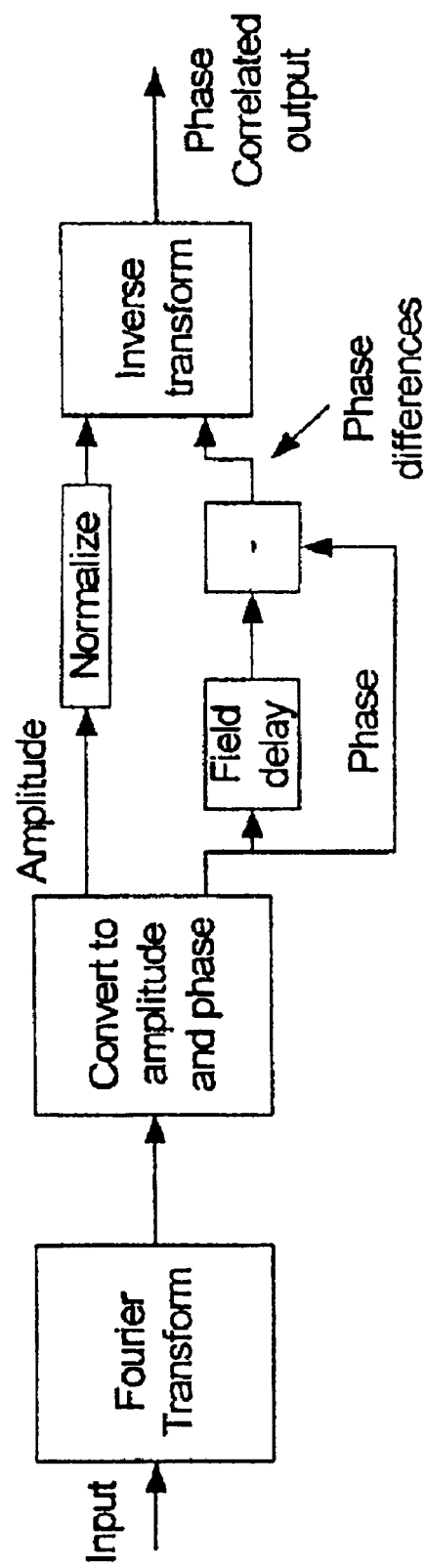
FIG. 11 is a block diagram of a phase correlator.
Figure 12:
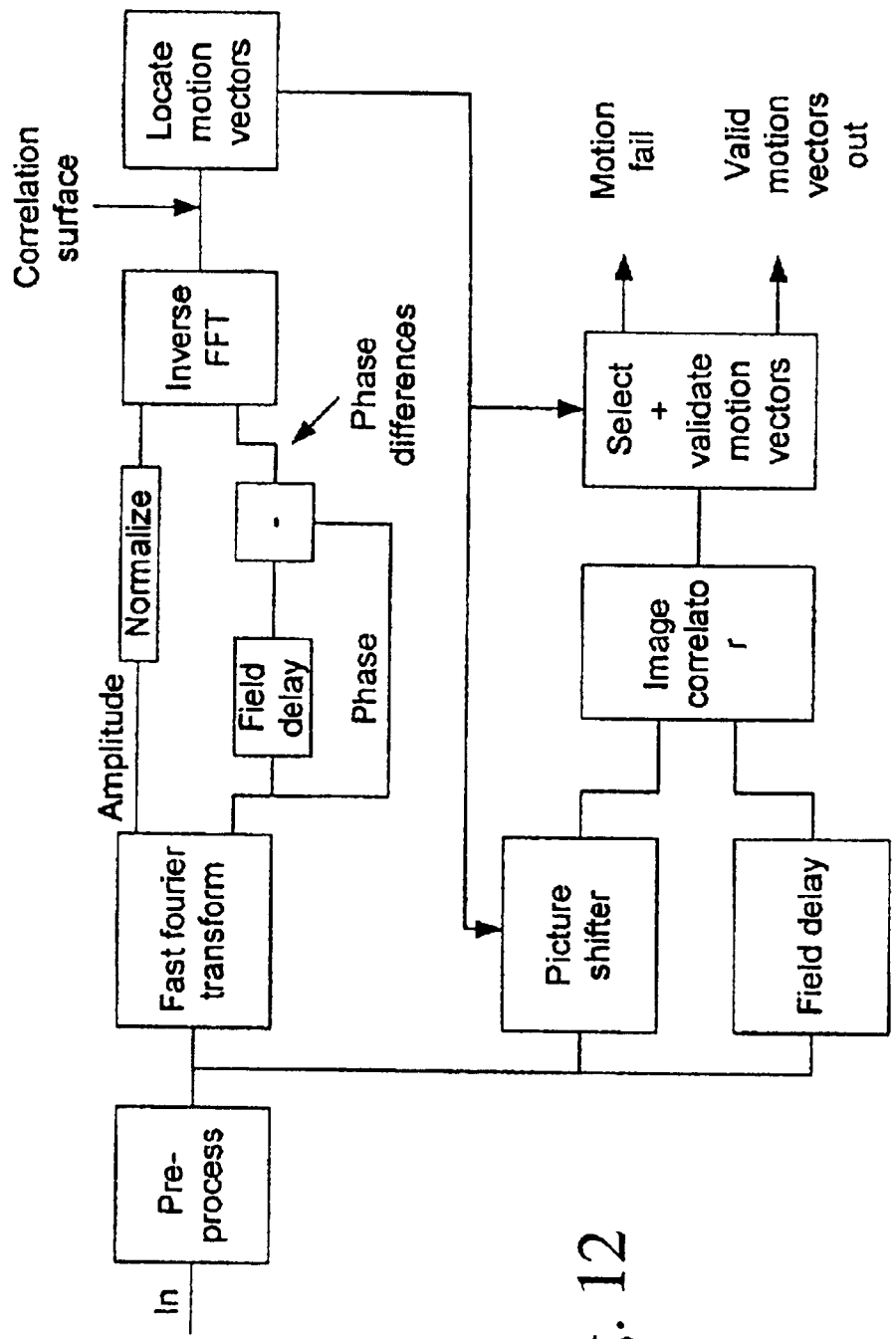
FIG. 12 is a block diagram of a phase correlated motion estimator.
Figure 13:
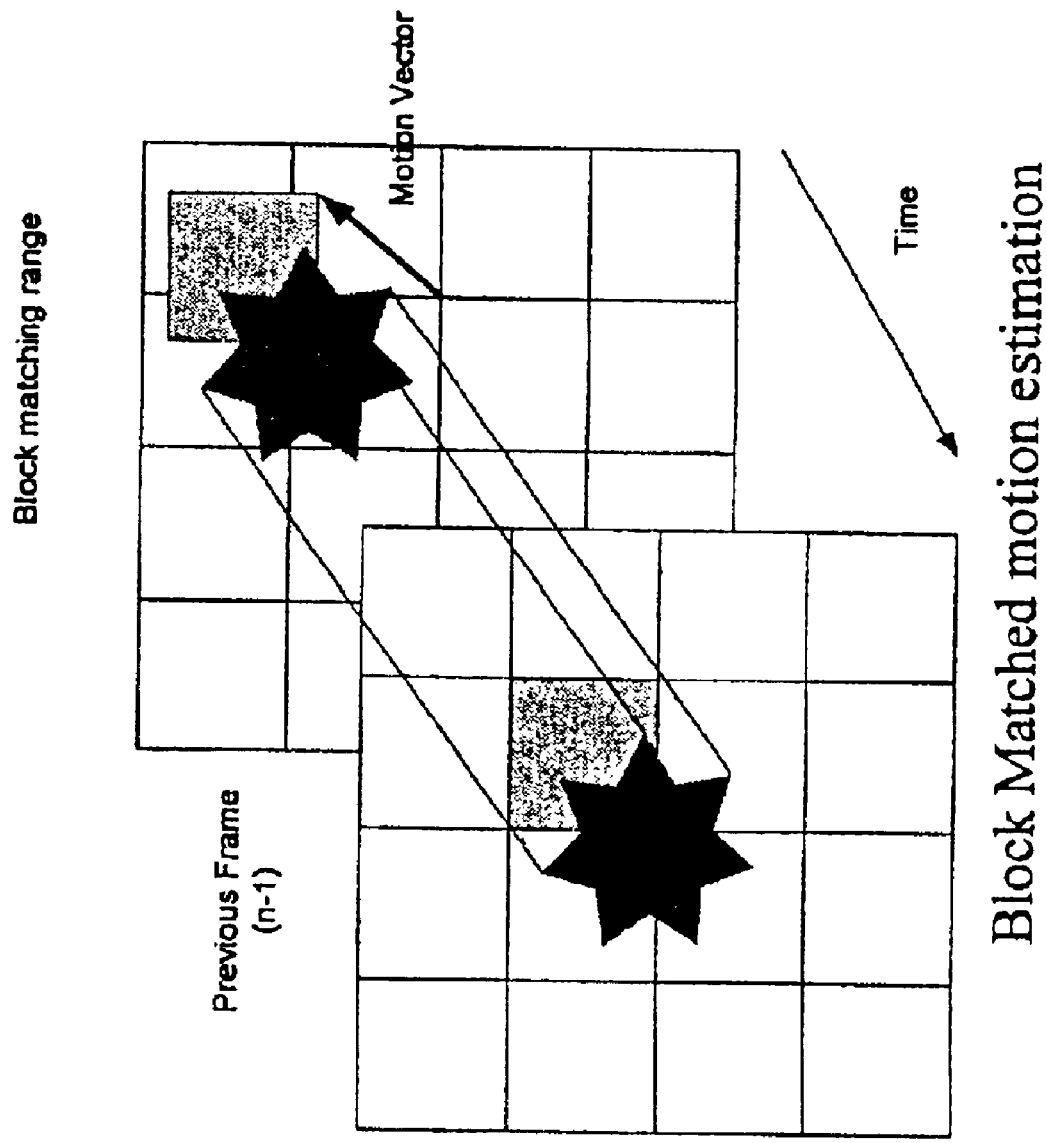
FIG. 13 is an illustration of a block-matched motion estimation process.
Figure 14:
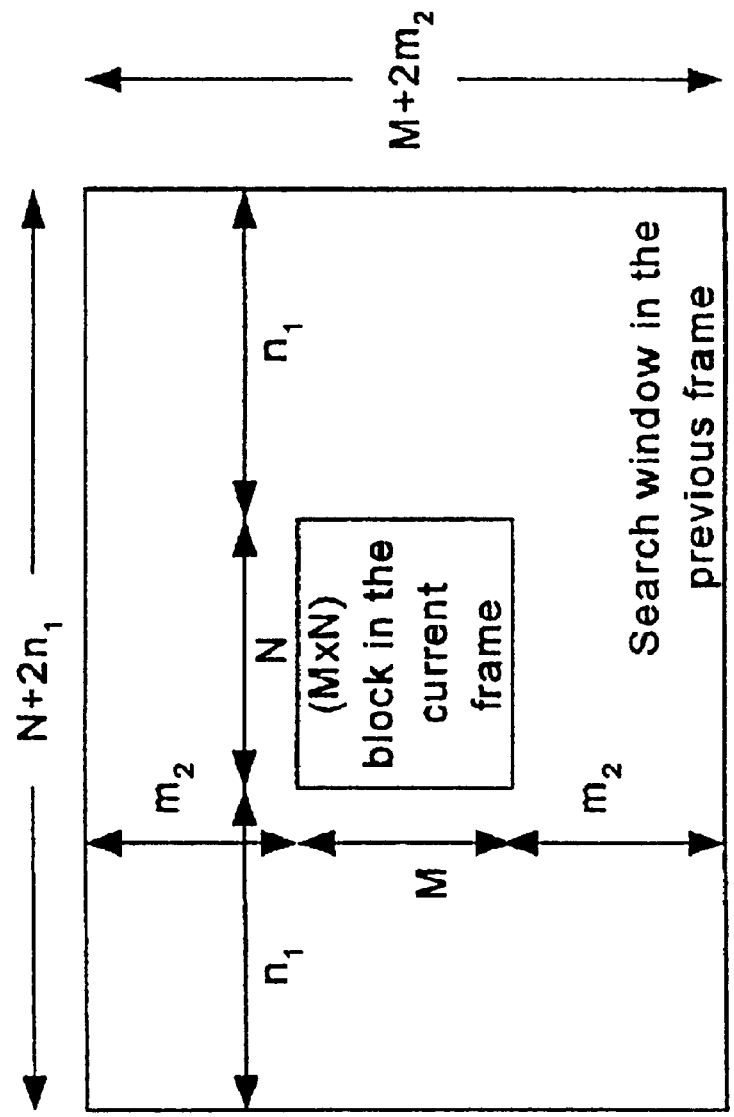
FIG. 14 is a diagram of the search window used in a motion estimation process.
Figure 15:
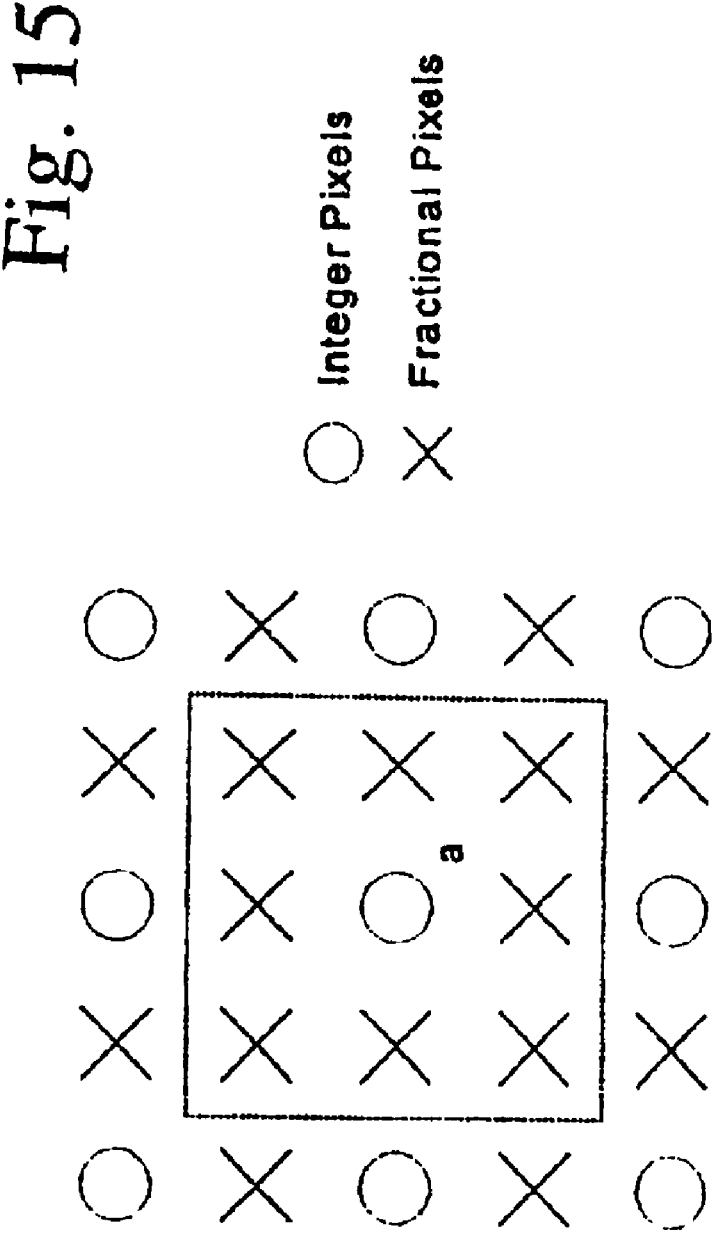
FIG. 15 is a diagram of the location of "fractional pixels" in a half-pixel accuracy motion estimation process.
Figure 16:
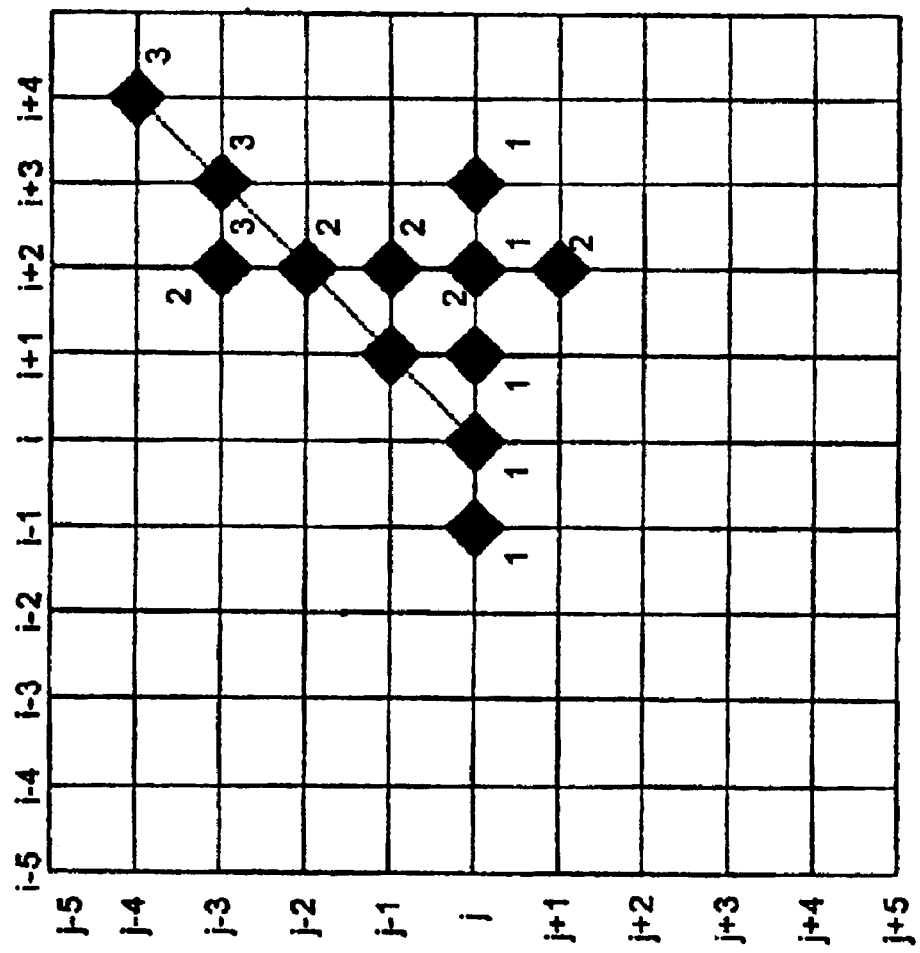
FIG. 16 is an illustration of a one-at-a-time search process.
Figure 17:
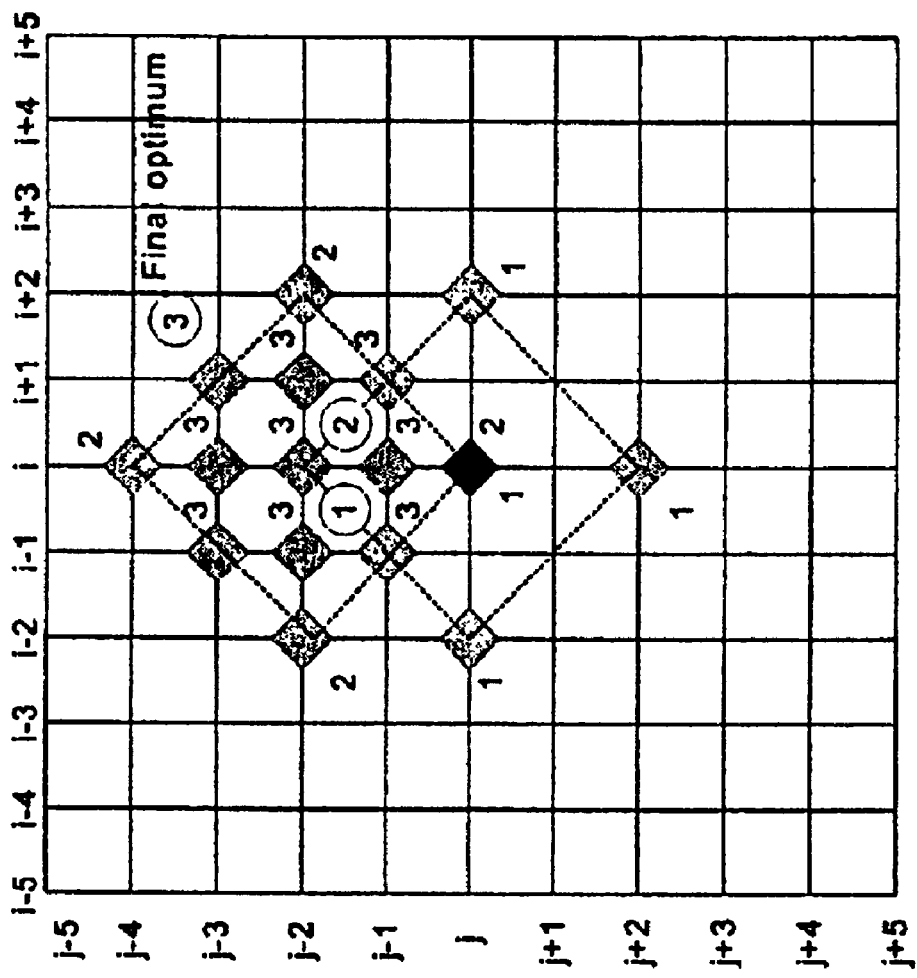
FIG. 17 is an illustration of a logarithmic search process.
Figure 18:
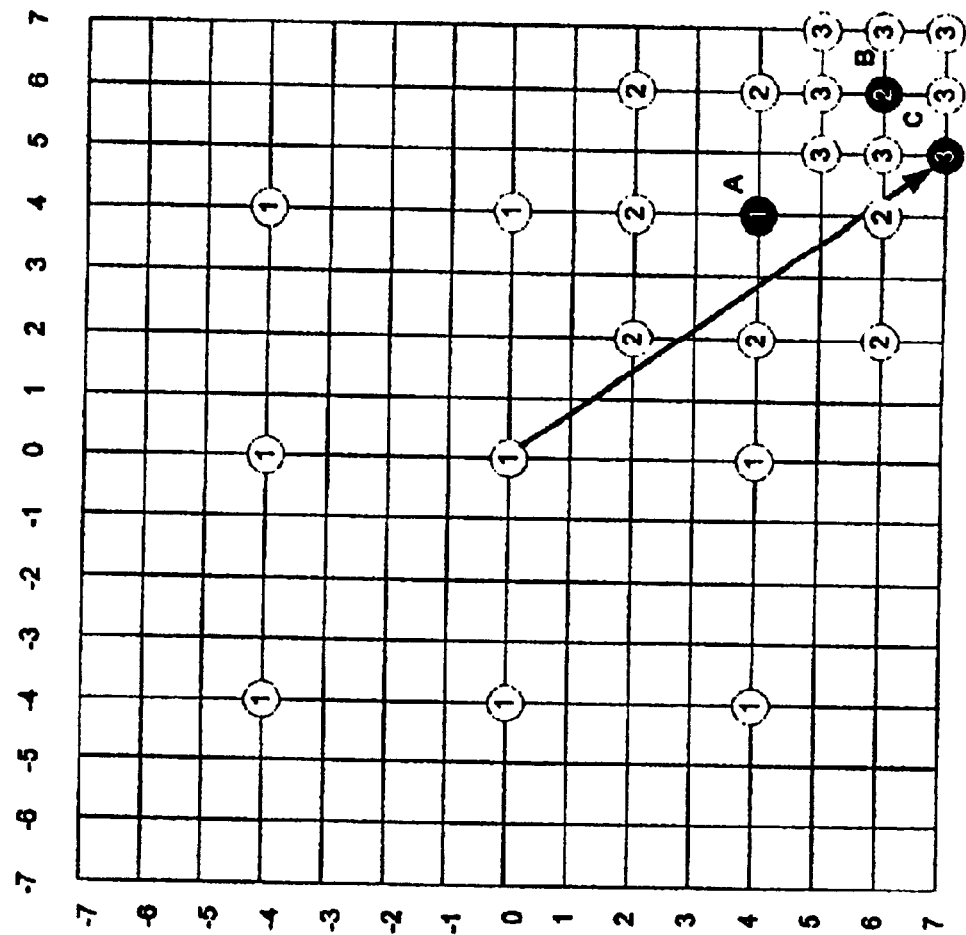
FIG. 18 is an illustration of a three-step search process.
Figure 19:
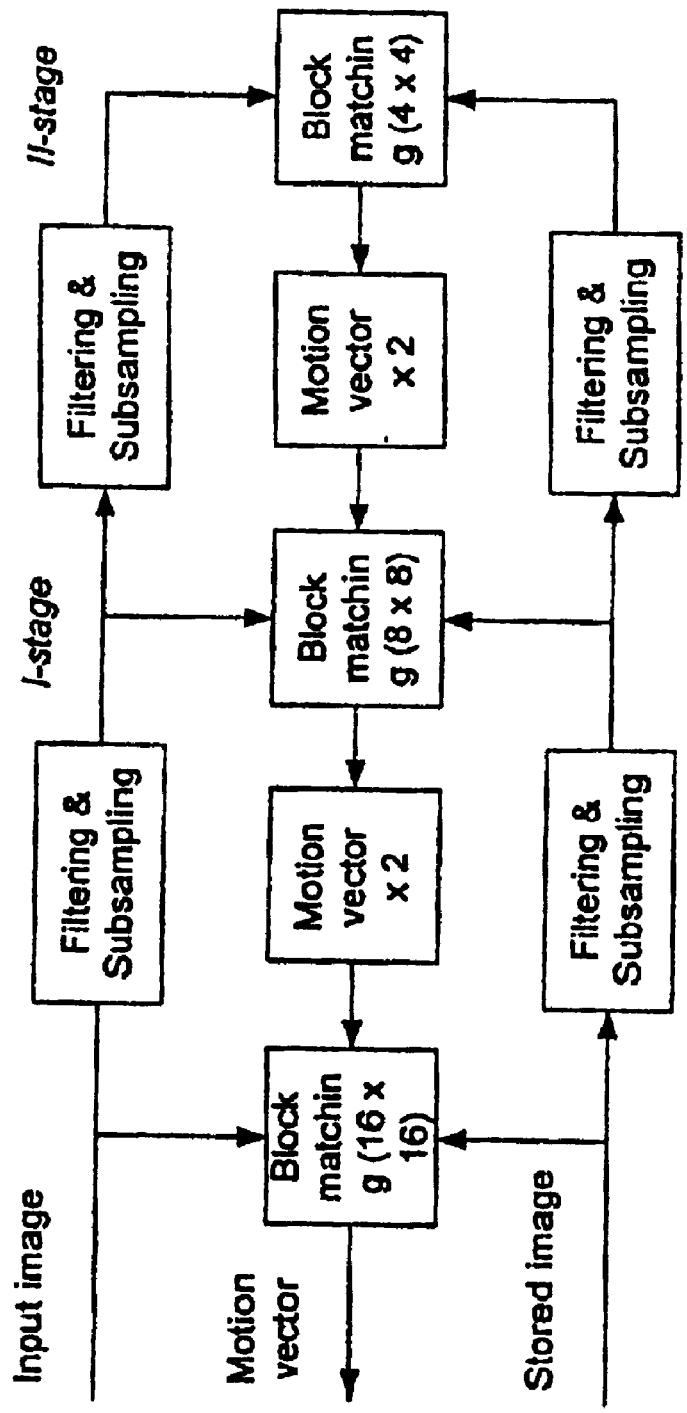
FIG. 19 is a block diagram of a hierarchical block matching process.
Figure 20:
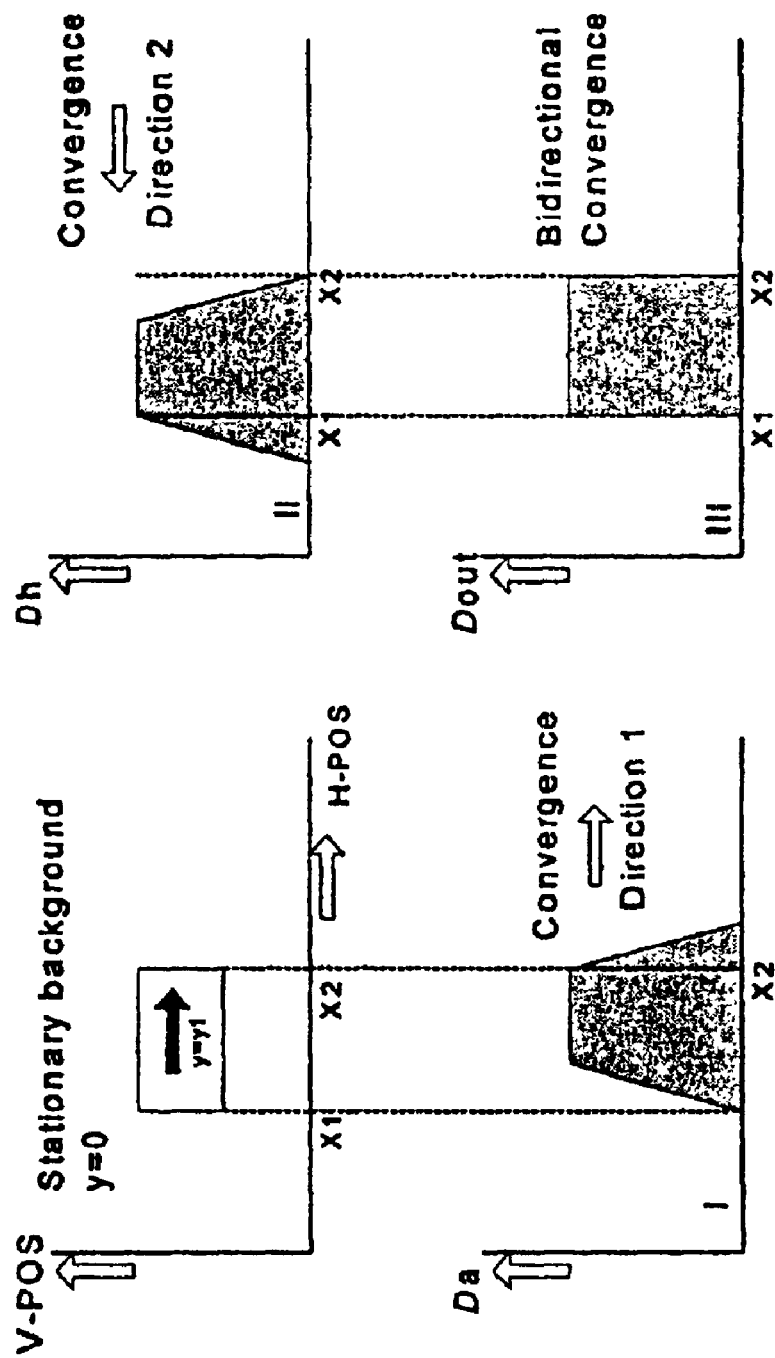
FIG. 20 is an illustration of the 2-D convergence principle.
Figure 21:
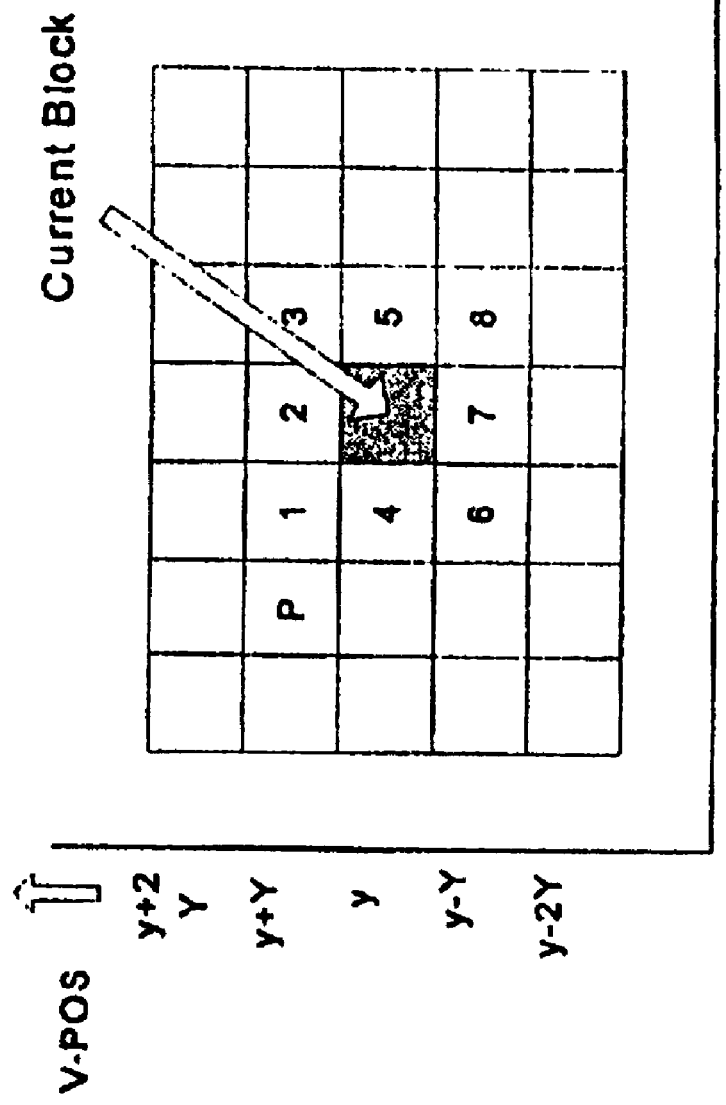
FIG. 21 is an illustration of convergence directions for a 2-D convergence process.
Figure 22:
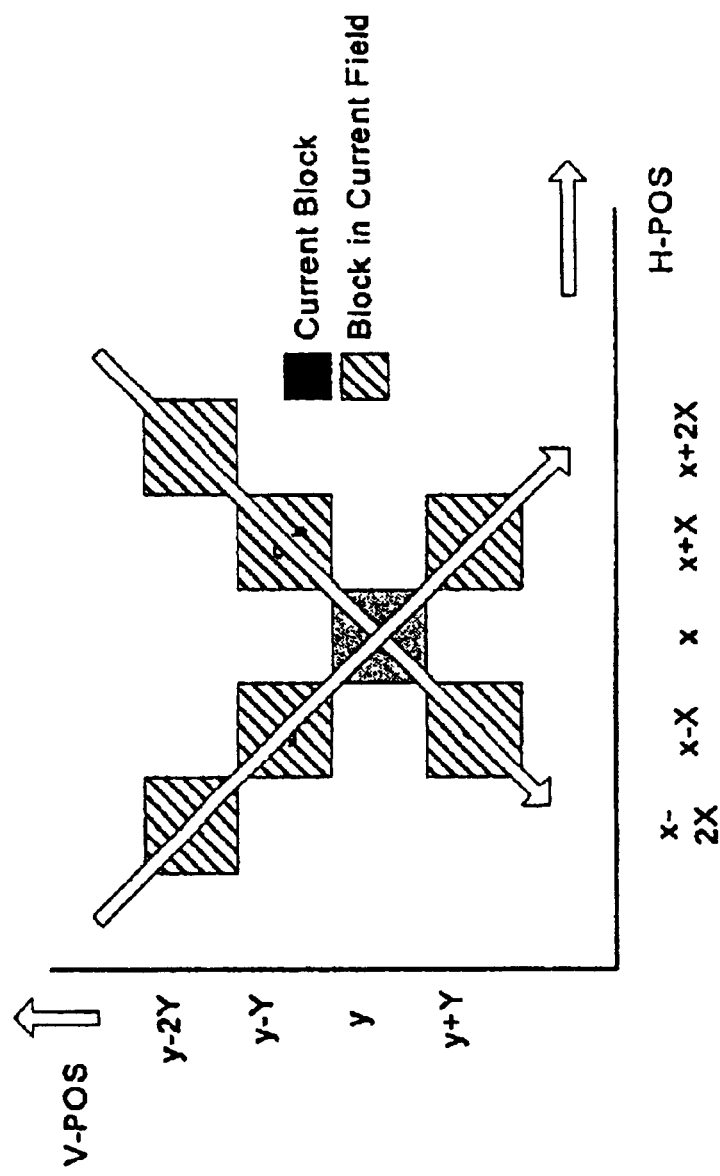
FIG. 22 is an illustration of convergence directions for a 3-D convergence process.
Figure 23:
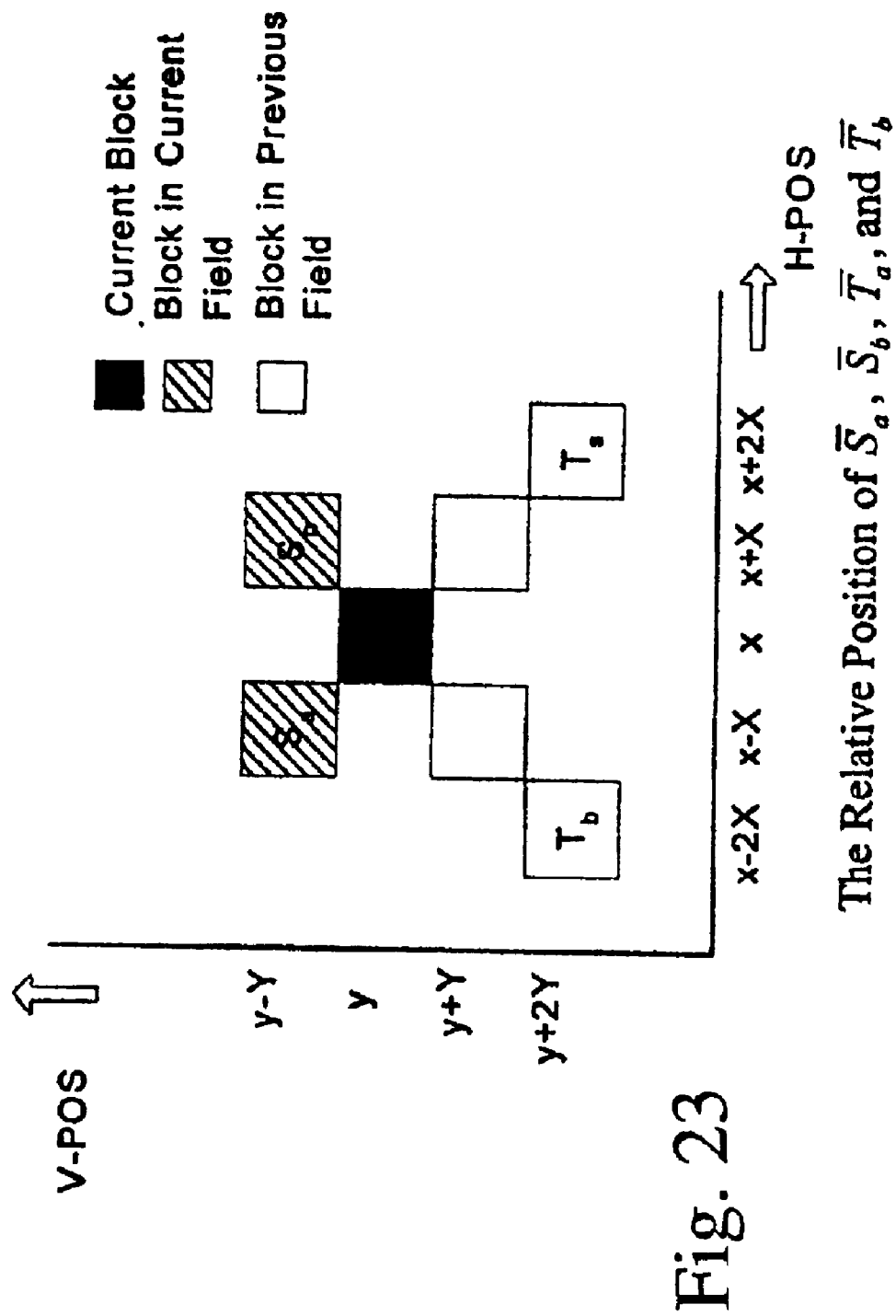
FIG. 23 is a diagram of the relative positions of blocks in a 3-D convergence process used in the preferred embodiment system.
Figure 24:
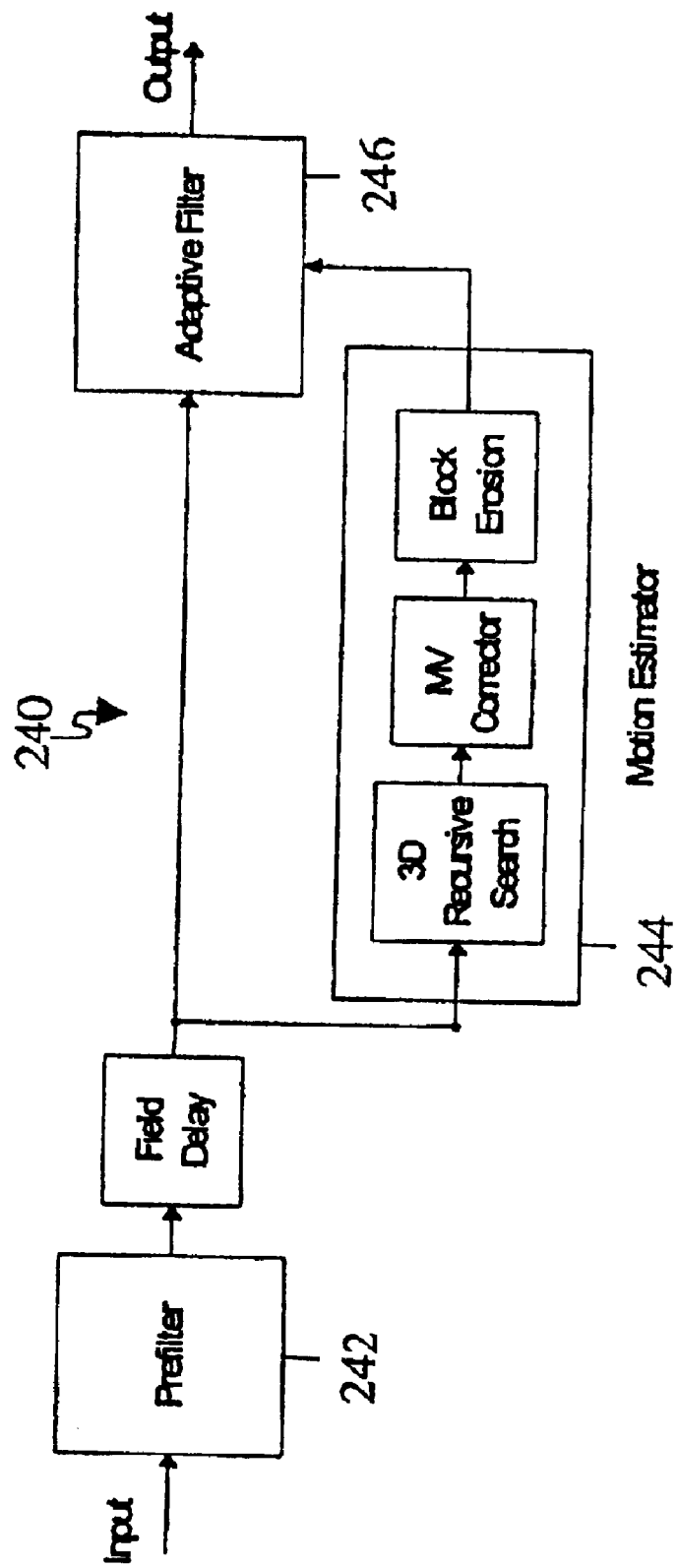
FIG. 24 is a block diagram of a preferred embodiment adaptive interlace-to-progressive scan conversion system.

FIG. 24 is a basic block diagram of an adaptive interlace-to-progressive scan conversion system according to the present invention, indicated generally at 240. The system comprises three general parts: a prefilter 242, a motion estimator 244, and an adaptive filter 246. Each of these parts is discussed in greater detail hereinbelow.

In most prior art interlace-to-progressive scan conversion algorithms both the filter and the motion estimator typically use the interlace fields as the input to produce the output. Since the field parity is different within each consecutive field, the motion estimator always compares the lines from current field (e.g. top field) with different lines (e.g. bottom field) from the previous field. This sometimes can lead the motion estimator to give defective motion vectors. To overcome this problem, a prefiltering is often applied to convert the interlace input to a progressive one. The filter should be able to do a simple deinterlacing process and also provide enough information to the motion estimator to better predict the motion vector. Simulation shows that pre-filtering also increases the performance of the "real" filter, as explained hereinbelow. At first it is tempting to use a sophisticated deinterlacing filter, but this defeats the purpose of prefiltering, and will impose a substantial hardware cost.

Thus, the prefilter is preferably a linear or an implicit motion adaptive filter. Implementing a motion detector is not feasible. Field insertion is a tempting choice, based on an assumption that normally there aren't many movements in the first few images in the sequence. Hence a perfect progressive scan image could be reconstructed. This can boost the "real" filter performance (that is, the performance of the adaptive filter 246) as the general sampling theories can be applied directly. However, after a few fields/frames, field insertion causes annoying serration line artifacts, especially when the image sequence changes to a new sequence. Thus, field insertion is a poor choice for the prefilter 242.

The preferred embodiment system 240 uses a spatial line average (SLA) filter for the prefilter 242. An SLA filter 242 passes all the temporal frequencies, which guarantees no motion artifacts. The SLA filter 242 also gives greater alias suppression. The principal drawback of using an SLA for the prefilter 242 is that the higher-frequency portion of the baseband is also suppressed, which causes the image to be blurred. However, since the human eyes is less sensitive to large area noise compares to small area but strong noise, this is acceptable. From simulations it has been determined that the SLA filter 242 even gives stronger temporal filtering than a motion-compensated median filter. This makes it the truly ideal choice for prefiltering.

The formal definition of a spatial line average filter is given by:

$$Fo(x, y, t) = \begin{cases} F(x, y, t), & (y \bmod 2 = t \bmod 2) \\ \dfrac{F(x, y+1, t) + F(x, y-1, t)}{2}, & (\text{otherwise}) \end{cases} \quad (2.1)$$

An SLA filter can also be easily adapted to the hardware, and has a very low hardware requirement. It only needs a few lines of buffer, a full adder, and right shift logic operator.

Turning now to the motion estimator 244, it will be appreciated that most motion estimator hardware that is available today is used in image compression. In image compression, the motion estimator is used to find a motion vector that produces the minimum error or difference. The smaller the difference, the less data needs to be sent, and thus the higher the compression ratio that can be achieved.

In interlace-to-progressive scan conversion, the goal is to find the "true motion" of the image. Experiments show that the smallest difference doesn't always give the most correct motion vector. A full search motion estimator, with the mean absolute error cost function, is good for image compression because it guarantees finding the smallest error motion vector. But this algorithm is not suitable for the deinterlacing process. It often gives incorrect motion vectors, which then result in a strong local distortion in the interpolated image. In certain types of image sequences the output of a motion compensated median filter using a full search motion estimator is even worse then non-compensated image, due to motion vector errors.

One explanation for this behavior is that some of the information in the current and previous fields is missing. A simple but somewhat extreme illustration: assume there is a motionless American flag in the image with the red and white stripes, in which each stripe occupies a single line. Thus, in the current field there are only red lines and in the previous field there are only white lines. Based on its criteria the motion estimator tries to find any location that contains primarily red pixels, and operates as though the flag has moved from it's previous location to this new location between the two fields. Clearly, this represents a substantial error in the motion estimation, and motion prediction based on this flawed estimate will likely be equally inaccurate. Note that normally even the smallest line in the picture will occupy more than one pixel line; hence the error typically introduced by motion estimation is not this extreme.

A prefiltering can be used to reduce the probability of prediction error. If the filter can perfectly deinterlace the image, theoretically, this will solve the problem of the error caused by the missing information, such as in the case discussed above.

Prediction error can also happen because of the size of the block is too small. Reducing the number of candidate vectors is also known to reduce the inconsistency of motion prediction.

Experiments also show that viewers perceive the artifacts cause by an incorrect motion vector to be worse than blur or global degeneration, despite the fact that this type of error yields a significantly lower mean square error. Since it is difficult to determine the true motion vector in the image sequence, most of the time all that can be done is to minimize the error. Therefore, the primary criterion in the selection of the motion estimator design should instead be to assure that the generated velocity field be smooth. Accuracy, at least initially, could be considered to be of secondary importance. The assumption here is that, though the motion estimator still can't give a true motion vector, at least it won't produce a motion vector that will cause strong local distortion. Based on this criterion, the motion estimator algorithm must contain elements that impose a smoothness constraint on the resulting motion vectors. At the same time, the additional constraints should not lead to a computationally complex algorithm.

The preferred embodiment system 240 uses a 3D recursive search as a basis for the motion estimator 244. This algorithm has several desirable characteristics that make it the best choice. It is block-based and thus requires far less computation than a full search. It requires only 8 candidate vectors. The small number of candidates vector reduces the chance of motion vector error and greatly reduces the complexity of computation. For example, a full search algorithm, using an 8×8 block and 32×32 search window will need $(32-8+1)2=625$ iterations to complete. The corresponding 3D recursive search requires only 8 iterations. The motion vector for each block in 3D recursive search is initially based on the neighboring motion vectors both in spatial and temporal region. This inherent smoothness constraint yields very coherent vector fields that closely correspond to the true motion of the objects. This makes it particularly suitable for the motion predictor 244 of the deinterlacing system 240.

In order to improve the performance of the 3D recursive search the accuracy of the motion predictor 244 is carried to sub pixel accuracy. This is done by adding elements to the lut (look up table) candidacy set. All that is required is an extension of the update set, with some update vectors with at least one non-integer component. The new lut used in the motion predictor 244 of the preferred embodiment system 240 consist of:

$$US_n = \left\{ \begin{pmatrix} 0 \\ 0 \end{pmatrix}, \begin{pmatrix} 0 \\ 1 \end{pmatrix}, \begin{pmatrix} 0 \\ -1 \end{pmatrix}, \begin{pmatrix} 1 \\ 0 \end{pmatrix}, \begin{pmatrix} -1 \\ 0 \end{pmatrix}, \begin{pmatrix} 0 \\ 2 \end{pmatrix}, \right.$$

$$\left. \begin{pmatrix} 0 \\ -2 \end{pmatrix}, \begin{pmatrix} 3 \\ 0 \end{pmatrix}, \begin{pmatrix} -3 \\ 0 \end{pmatrix}, \begin{pmatrix} 0 \\ \frac{1}{4} \end{pmatrix}, \begin{pmatrix} 0 \\ -\frac{1}{4} \end{pmatrix}, \begin{pmatrix} \frac{1}{4} \\ 0 \end{pmatrix}, \begin{pmatrix} -\frac{1}{4} \\ 0 \end{pmatrix} \right\}$$

(2.2)

Quarter pixel accuracy is normally considered to yield the "true motion" of the object and will increase the performance of the deinterlacing filter. The principal drawback of introducing sub-pixel accuracy is that the 3D recursive search block matcher has a somewhat slower convergence. It is clear that additional small fractional update will reduce the appearance of the larger update vectors. This, however, is relatively unimportant compared to the improved smoothness of the estimated velocity field caused by sub-pixel accuracy.

A bilinear interpolation is used to calculate the sub pixel value. Assuming the coordinates of the pixel are given by (x, y), the formal definition of the bilinear interpolation is defined as:

$$F(x, y, t) = (yf \cdot xf \cdot F(xi, yi, t)) + \qquad (2.3)$$

$$(yf \cdot (1-xf) \cdot F(xi+1, yi, t)) + ((1-yf) \cdot xf \cdot F(xi, yi+1, t)) +$$

$$((1-yf) \cdot (1-xf) \cdot F(xi+1, yi+1, t))$$

where $$yf = \lfloor y \rfloor \quad xf = \lfloor x \rfloor$$

and $$yi = y - \lfloor y \rfloor \quad xi = x - \lfloor x \rfloor$$

It sometimes happens that blocks shifted over very different vectors with respect to the current block contain the same information. This is a particular problem with periodic structures. When confronted with this situation, a block matcher will randomly select one of these vectors based on small differences in the matching error caused by noise in the picture. If the estimate is used for temporal interpolation, very disturbing artifacts will be generated in the periodic picture part. For the 3D Recursive Search block matcher, the spatial consistency could guarantee that after reaching a converged situation at the boundary of a moving object, no other vectors will be selected. This, however, functions only if none of the other candidate vectors that yield an equally good matching error are ever generated. A number of risks jeopardize this constraint:

1. An element of the update sets $US_b$ (x, y, t) and $US_b$ (x, y, t) may equal a multiple of the basic period of the structure.
2. The other estimator may not be converged, or may be converged to a value that doesn't correspond to the actual displacement.
3. Directly after a scene change, it is possible that one of the convergence accelerators $T_a(x,y,t)$ or $T_b(x,y,t)$ yields the threatening candidate.

It is possible to minimize the risks mentioned under 1 and 3 above by adding penalties to the error function related to the length of the difference vector between the candidate to be evaluated and some neighboring vectors. For the 3D recursive search block matcher, a very simple implementation is realized with a penalty depending on the length of the update:

$$e(\overline{C}, x, y, t) = \qquad (2.4)$$

$$\sum_{x \in B(x,y,t)} |F(x, y, t) - F(x - C_x, y - C_y, t - T)| + \alpha \cdot \|\overline{U}(x, y, t)\|$$

It has been experimentally determined that fixed penalties for all updates can be applied. Optimization led to values for these fixed penalties ($\alpha$) of, respectively, 0.4%, 0.8% and 1.6% of the maximum error value, for the cyclic update, the convergence accelerator and the fixed 0 candidate vector. This last candidate especially requires a large penalty, as it introduces the risk of convergence interruption in flat areas.

The risk described in point 2 above, however, is not reduced with these update penalties. This situation typically occurs if a periodic part of an object enters the picture from the blanking or appears from behind another object in the image. In this situation one of the two estimators can converge to a wrong vector value since there is no boundary moving along with the periodic picture part to prevent this. Therefore an attempt to cope with this problem is made by linking the two estimators. $S_a(x,y,t)$ is set to the value of $S_b(x,y,t)$ if:

$$e(\overline{MV}_a,\bar{X}-\overline{SMV}_a,t) > e(\overline{MV}_b,\bar{X}-\overline{SMV}_b,t)+Th \quad (2.5)$$

where Th is a fixed threshold, and, conversely, $S_b(x,y,t)$ is set to the value of $S_a(x,y,t)$ if:

$$e(\overline{MV}_b,\bar{X}-\overline{SMV}_b,t) > e(\overline{MV}_a,\bar{X}-\overline{SMV}_a,t)+Th \quad (2.6)$$

The threshold Th above turns out to be useful, as the advantage of two independent estimators would otherwise be lost.

Even though several techniques have been applied to increase the performance of the 3D recursive search, it can still sometimes gives an incorrect motion prediction. For moving parts in the image this is not a serious problem, since in most circumstances the adaptive filter will do an intra-field interpolation as a compensation of motion vector error, as is discussed further hereinbelow. Further, since the image is moving, slight degradation of the image quality is not generally noticeable to the human eye.

However, with respect to static portions of the image it has been observed experimentally that incorrect motion predictions will cause annoying artifacts such as flickering on the edge boundaries. The effect is worse where there is a repeated pattern in a static, background part of the image. All artifacts in the static portions of the image are normally noticeable by human eyes. To cope with these artifacts, further emphasis should be given to the static part of the image. The best way to deal with these artifacts is to use both the motion estimator/predictor 244 and the adaptive filter 246.

The motion predictor can be used to improve performance in static portions of the image by implementing a motion correction algorithm. One simple approach would be to calculate the motion vector between the current and the next fields and use the motion vector information to help correct the motion vectors. The principal problem with this approach is that it requires more memory to save both the previous and next motion vectors' information. The amount of exta memory required will generally make this approach infeasible. A more efficient solution, in terms of hardware requirements, is based on a simple and quite powerful assumption. In the presently preferred embodiment, it is assumed that the momentum of the object motion between a small number of consecutive fields (in this case there are 3 fields) is constant. In other words, it is assumed that the motion vector for an object between the previous and the current fields is the same as the motion vector between the current and the next fields.

Figure 25:
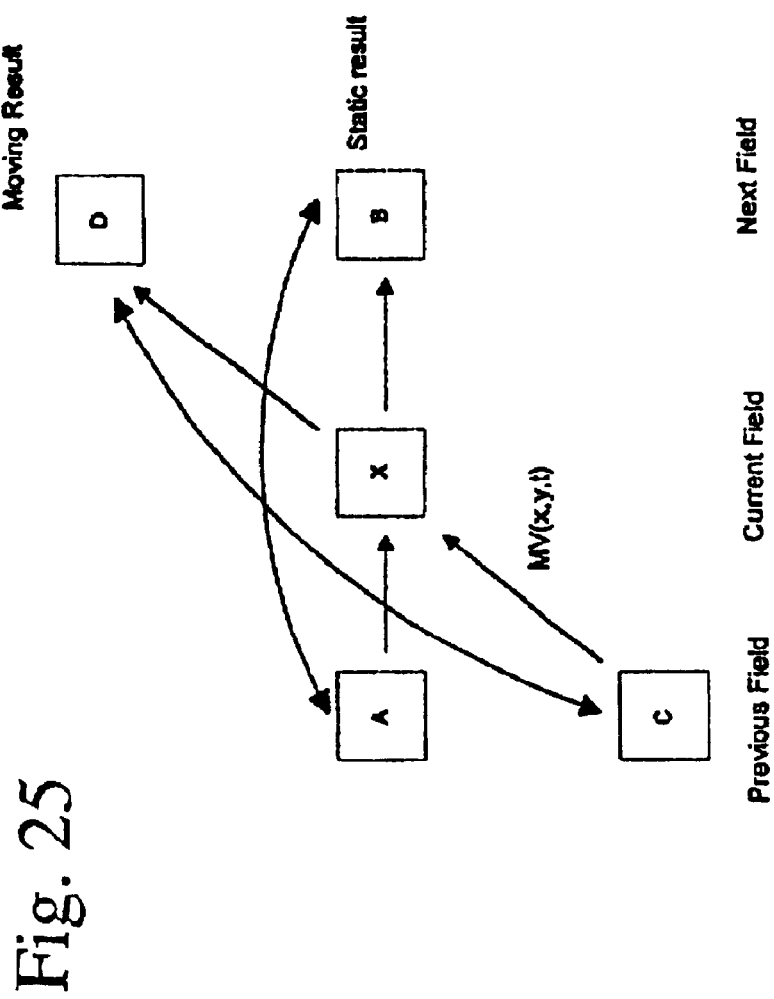
FIG. 25 is an illustration of certain features of a motion vector correction process according to the present invention.

A first method of motion vector error correction based on this assumption that was experimentally tested is illustrated in FIG. 25 and is formally defined by:

$$\overline{MV}(x,y,t) = \begin{cases} \begin{pmatrix} 0 \\ 0 \end{pmatrix}, & (e_m(x,y,t) \geq e_s(x,y,t)) \\ \overline{MV}(x,y,t), & (e_m(x,y,t) < e_s(x,y,t)) \end{cases} \quad (2.7)$$

where:

$$e_m(x,y,t) = \frac{\sum_{x \in X}|F(X)-F(C)| + \sum_{x \in X}|F(X)-F(D)|}{2} \quad (2.8)$$

$$e_s(x,y,t) = \frac{\sum_{x \in X}|F(X)-F(A)| + \sum_{x \in X}|F(X)-F(B)|}{2} \quad (2.9)$$

and where A, B, C, D, and X are blocks as shown in FIG. 25.

Though this algorithm makes significant improvement in the static areas of the image, it fails to correct the motion if the difference in the static parts between the current field and the previous field is large (as, for example, with the American flag example above).

A second, preferred method of motion vector error correction based on the assumption of negligible change in velocity that was experimentally tested is formally defined by equation 2.7 above, but replaces conditions 2.8 and 2.9 with the following:

$$e_m(x,y,t)=\Sigma|F(C)-F(D)| \quad (2.10)$$

$$e_s(x,y,t)=\Sigma|F(A)-F(B)| \quad (2.11)$$

Note that this provides an even simpler algorithm for motion error correction.

Criteria 2.10 and 2.11 are based on the assumption that if the difference between the previous and the next fields in a given part of the image is small, it is safe to assume that the given part is static. Because this method doesn't calculate the error based on the current field, the problem of the first method is solved. Furthermore, because the previous and the next fields initially contain the same information (since both are either top field or bottom field), this method performs better.

Note that, in the case where a large difference between previous and current fields is in fact caused by a fast moving object (fast enough that the object does not appear in the search window in two consecutive fields), it is still safe to assume that the block is static. The motion vector is out of the range of the searching window, so instead of pointing to somewhere randomly, it is better if the motion vector is equal to 0. The moving object part in the block will be handled by the intra-field interpolation of the adaptive filter while the static background in the block can be deinterlace perfectly.

The principal disadvantage of this method is that it might introduce some inconsistency into the motion vector smoothness. Most of the time an image is divided into several parts of static and moving areas, so normally the neighborhood of a static block is also static blocks and the neighborhood of the moving block is also moving blocks. Based on this fact, typically if the motion corrector decides to produce a static motion vector output for a block, its neighboring blocks should also be static.

Another assumption that can be made is that most of the time the search window is large enough to contain most of the motion vectors. Based on the combination of these two assumptions the inconsistency that is introduced by the method of motion error correction defined in equations 2.7, 2.10, and 2.11 should be insignificant. This motion corrector only needs a subtraction block to calculate the difference and a comparator, so its hardware implementation is simple.

In nearly every prior art practical application the mean absolute error criterion is used as the cost/criterion function to determined the motion vector. The mean square error is too complex to practically implement in hardware for most applications, since it requires multiplication and power operations. On the other hand, mean absolute error can be implemented with a simple subtraction block, XOR, and shifting logic. The principal drawback to mean absolute error is that the output does not contain any deviation information.

In the preferred embodiment the cost function is given by:

$\forall F(x,y,t) \in B(x,y,t)$:

$D = |F(x,y,t) - F(x-MV_x, y-MV_y, t-1)|$ $TD = TD + D$ $\textit{Diff} = D - \textit{EstErr}$ $\textit{EstErr} = \textit{EstErr} + (\delta \cdot \textit{Diff})$;

$Dev = Dev + \delta(|\textit{Diff}| - Dev)$ \hfill (2.12)

Where the initial value for TD, EstErr, and Dev are all equal to zero.

If the motion information is limited to one vector per block of pixels, motion compensation sometimes creates visible block structures in the interpolated picture. The block sizes commonly used in block matching are in a range that gives rise to very visible artifacts. A post-filter on the vector field can overcome this problem, but this has the drawback that discontinuities in the vector field are blurred as well. For this reason, a preferred embodiment system according to the present invention employs a post-operation that eliminates fixed block boundaries from the vector field without blurring the contours. The post operation also prevents vectors that do not result from the estimator from being generated. This is especially useful where algorithms can yield vectors that have poor relation to the actual object velocities. In case of a velocity field for which one vector per block is available the preferred embodiment divides each block B(x,y,t) according to:

$B(x,y,t) = \{(x,y) | X_x - X/2 \leq x \leq X_x + X/2 \wedge X_y - Y/2 \leq y \leq X_y + Y/2\}$ \hfill (2.13)

to which a vector $\overline{MV}(x,y,t)$ is assigned, into four sub-blocks $B_{i,j}$ (x, y, t)

$$B_{i,j}(x, y, t) = \left\{(x, y) \Big| X_x - (1-i) \cdot \frac{X}{4} \leq x \leq X_x + (1+i) \cdot \frac{X}{4} \wedge X_y(1-j) \cdot \frac{Y}{4} \leq y \leq X_y + (1+j) \cdot \frac{Y}{4}\right\}$$ \hfill (2.14)

where the variables I and j take the values +1 and −1. To the pixels in each of the four sub-blocks $B_{i,j}$ (x, y, t) a vector $MV_{i,j}$ (x, y, t) is assigned:

$\forall (x,y) \in B_{i,j}(x,y,t): \overline{MV}_{i,j}(x,y,t) = \overline{MV}_{i,j}(\overline{X},t)$ \hfill (2.15)

where:

$\overline{MV}_{i,j}(\overline{X},t) = \text{med}[\overline{MV}(x+i \cdot X, y, t), \overline{MV}(\overline{X},t), \overline{MV}(x, y+j \cdot Y, t)]$ \hfill (2.16)

The median function is a median on the x and y vector components separately:

$$med(\overline{X}, \overline{Y}, \overline{Z}) = \begin{pmatrix} \text{median}(X_x, Y_x, Z_x) \\ \text{median}(X_y, Y_y, Z_y) \end{pmatrix}$$ \hfill (2.17)

Figure 26:
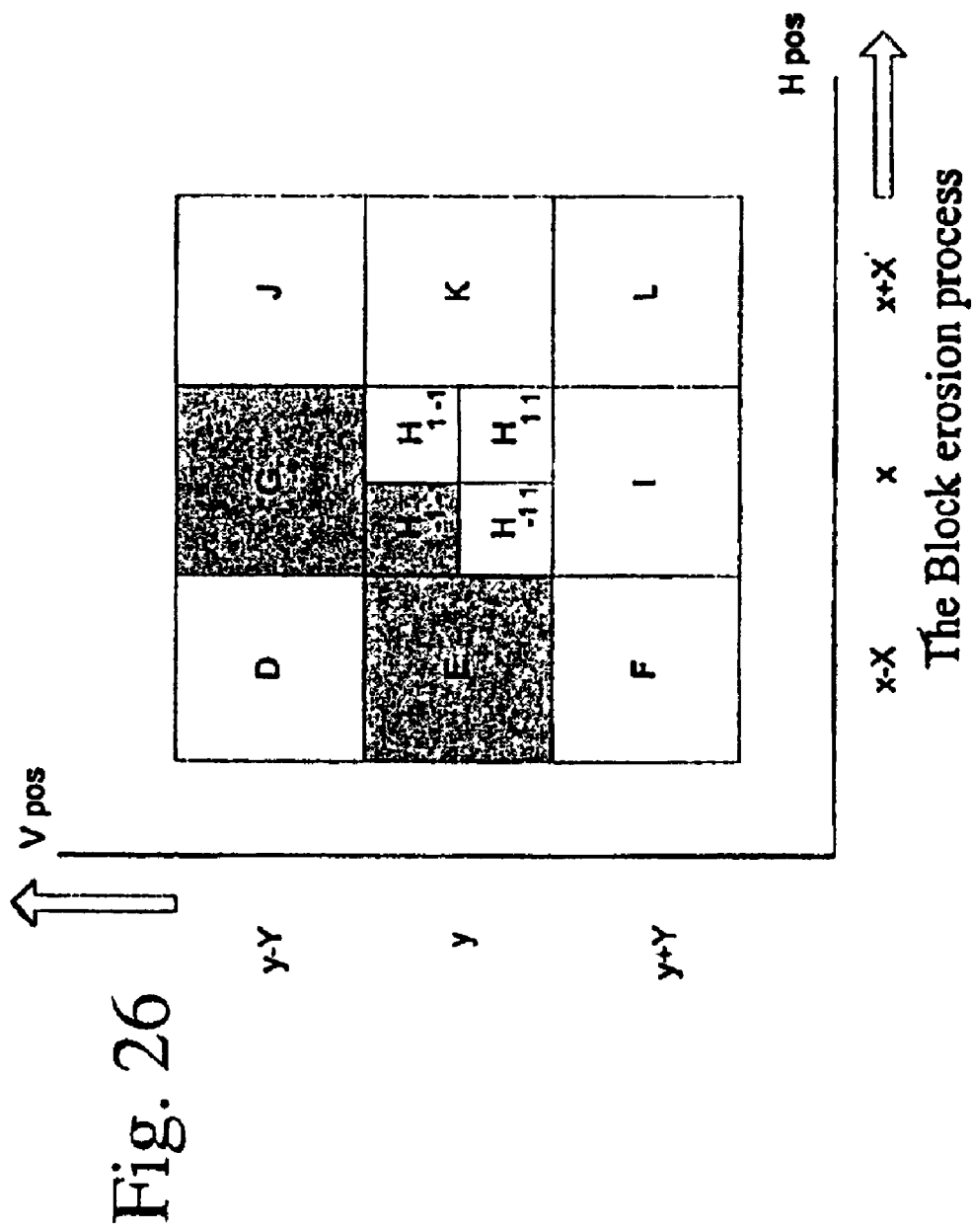
FIG. 26 is an illustration of a block erosion process suitable for use in a system according to the present invention.

Because of this separate operation, a new vector that was neither in the block itself nor in the neighboring blocks can be created. To prevent this, the preferred embodiment checks whether the new vector is equal to one of the three input vectors, and if it is not the original motion vector is applied. FIG. 26 illustrates the process. The motion vectors are taken from the neighboring shaded areas. To calculate the result for sub-block H the neighboring blocks E, G, and H itself are used.

A number of adaptive filters suitable for use as the adaptive filter 246 will now be discussed. In certain embodiments the adaptive filter 246 is a median filter. The principal shortcoming of using a median filter for the adaptive filter 246 is that it introduces aliasing. In certain other embodiments a line averaging filter is used. The chief limitation of line averaging filters, when used for the adaptive filter 246, is that they suppresses the higher baseband frequencies, resulting in image blurring.

In certain other embodiments the adaptive filter 246 is an adaptive recursive filter. An adaptive recursive filter 246 reduces most of the artifacts that are caused by a conventional filter. Nevertheless, there are few limitations with this type of filter. In this method, the intra-field line average interpolation is used for interpolating a fast moving object in the image where the motion vector cannot cope with the motion, and also for protection when the motion predictor gives a wrong vector. For a fast moving object, this interpolation works well because human eyes are not very sensitive to artifacts in fast moving objects.

However, the intra-field interpolation will introduce blur in the case of scene changes, and when a new object or background appears from behind a moving object, or both. This is expected, and the best result this method can do, since in both cases there is no information available from the previous field. The artifacts will be noticeable by human eyes because most of the blurring parts now are static. It will remain in the next few fields until the motion estimator produces a correct motion vector. The effect will be even worse if the new object or scene that appears happens to be a periodic pattern image. Sometimes even the filter gives a wrong prediction and doesn't use an intra-field interpolation. Instead, it uses the pixel values (that is point by the motion vector) from the previous field resulting in a strong noticeable artifact and breakdown on the edges of the moving object. Another problem that was found during simulations is that the intra-field interpolation that is used as protection from incorrect motion vectors sometimes produces an annoying artifact. In certain experimental images having periodic static parts with very small patterns, incorrect motion predictions were generated, even using a standard 3D recursive search. The deinterlace image therefore had a blurred static background.

In certain other embodiments an 11-tap weighted median time recursive filter is used for the adaptive filter 246 This method is designed based on the time recursive filter. The input for this filter 246 is prefiltered using an SLA filter 242. Rather than simply using the motion compensation pixel data from the previous field, this filter 246 uses an 11-tap weighted median to decide the interpolated pixel. The formal definition of this filter 246 is given by:

$$F_o(x, y, t) = \begin{cases} F(x, y, t), & (y \bmod 2 = t \bmod 2) \\ \text{med}\left(A, B, C, D, E, F, G, G, H, H, \dfrac{B+E}{2}\right), & \text{(otherwise)} \end{cases} \quad (2.18)$$

where:

$A = F(x-1, y-1, t)$ $B = F(x, y-1, t)$ $C = F(x+1, y-1, t)$ $D = F(x-1, y+1, t)$ $E = F(x, y+1, t)$ $F = F(x+1, y+1, t)$ $G = F(x, y, t-1)$ $H = F(x - MV_x, y - MV_y, t-1)$ \hfill (2.19)

From the definition it can be seen that this algorithm gives double protection in the case of an incorrect motion vector. It implicitly detects the static image part, though the motion vector is incorrect, by introducing the G factor in the weighted median. In the case of fast moving objects, or an incorrect motion vector, the intra-field interpolation is selected from A, B, C, D, E, F, and ½(B+E). The weight of the G and H factors are doubled to give stronger temporal filtering. The results of this method are quite good. Nevertheless, this algorithm does not completely resolve the problems that occur with an adaptive recursive filter 246 The experimental results with the images having periodic static portions with very small patterns indicated that the static portions with the periodic, small patterns were still blurred in the deinterlaced image. This situation is close to the extreme example of American flag problem described above; it is nearly a worst-case scenario.

The preferred embodiment employs a 3-stage adaptive recursive filter to cope with such worst-case scenarios. It should be noted that the problems that are found with the adaptive recursive filter actually occur in other filter algorithms, as well. The different algorithms adapt to these problems in different ways. The principal problems into two categories: no or missing information, and static portions of the image with small periodic patterns.

In the case of no information, such as occurs directly after a scene change, or when a new object or background appears from behind a moving object, it is possible to interpolate the missing pixels better by using the information from the next field. Assuming that at least the direction of the object motion is not changed (if the momentum is not constant), the next field should contain the information of the new object that just appears, and that part of the image can be better interpolated. The same thing can be applied for changes of scene.

For periodic static parts of the image a simple field insertion filter can solve the problem. It will be appreciated that field insertion filters have the best result in the absence of motion. Further notice, however, should be given on the boundaries between the static background and the moving object to prevent the serration of the moving edge. Regarded this way, the problem is to decide when and where to apply a field insertion filter.

Figure 27:
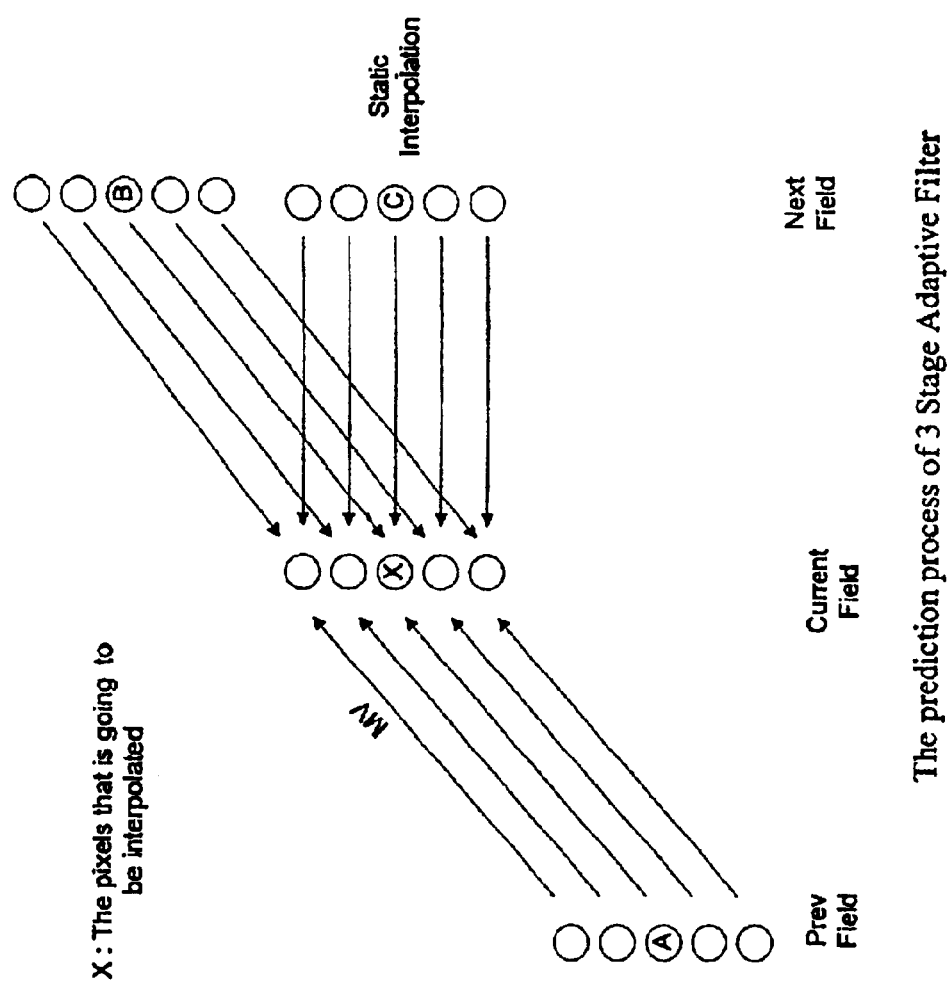
FIG. 27 is a diagram of the prediction process of a three-stage adaptive filter suitable used in the preferred embodiment system according to the present invention.

The novel three-stage adaptive recursive filter of the preferred embodiment is illustrated in FIG. 27, and defined in the following equations. In the first stage, the algorithm decides whether to use static pixels data or moving pixels data from the next field. The process of obtaining the moving pixels data is based on the assumption that the motion vector that is applied to the object is constant between these three fields. The selection is made based on the differences between these two data sets and the pixel data in the current field. The selection process is formally defined by:

$$F_n(x, y, t) = \begin{cases} F(x + MV_x(x, y, t), y + MV_y(x, y, t), t+1), & (D_m < D_s) \\ F(x, y, t+1), & (D_m \geq D_s) \end{cases} \quad (2.20)$$

where:

$$D_s = \sum_{k=-2}^{2} C_v(k) \cdot |F(x, y+k, t) - F(x, y+k, t+1)| \quad (2.21)$$

$$D_m = \sum_{k=-2}^{2} C_v(k) \cdot |F(x, y+k, t) - F(x - MV_x(x, y, t), y - MV_y(x, y, t) + k, t+1)| \quad (2.22)$$

$D_m$ and $D_s$ are the difference between interpolated pixels in the current field with the moving or static pixels in the next field respectively. $C_v(k)$ is the coefficient of vertical LPF, and k is vertical shift in field.

Information from the next field is important for enhancing the performance of the filter. In the absence of motion, the static pixel data provide the missing information that cannot be obtained from previous field in the cases of new objects or backgrounds appearing from behind a moving object or directly after a scene change. Information from the next field also increases the cohesiveness in the temporal domain of both the static and moving interpolation.

In the second stage of the 3-stage process the motion compensated data from the previous field and the data that obtained from the first stage are used to determine which data is more valid, or have more or better influence. An adaptive fading is used between these two data sets. This function is based on the correlation of all data with the pixel data in the current field.

The last stage of the filter combines the result of the second stage process with an intra-field interpolation. The intra-field interpolation is used to predict a fast moving object and also to insure the robustness of the filter. The formal definition of the filter can be given by:

$$F_o(x, y, t) = \begin{cases} F(x, y, t), & (y \bmod 2 = t \bmod 2) \\ (c_i \cdot F_i(x, y, t)) + (1 - c_i)(c_p \cdot F_p(x, y, t) + \\ \quad (1 - c_p) F_n(x, y, t)), & \text{(otherwise)} \end{cases} \quad (2.23)$$

where:

$$F_i(x, y, t) = \frac{F(x, y-1, t) + F(x, y+1, t)}{2} \quad (2.24)$$

is the intra-field interpolation;

$$F_p(x, y, t) = F(x - MV_x(x, y, t), y - MV_y(x, y, t), t-1) \quad (2.25)$$

is the backward data prediction;

Fn(x,y,t) is the forward data prediction defined in equation 2.19; and $c_i$ and $c_p$ are adaptive coefficients ranging from 0–1

While the invention has been illustrated and described in detail in the drawings and foregoing description, the description is to be considered as illustrative and not restrictive in character. Only the preferred embodiments, and such alternative embodiments deemed helpful in further illuminating the preferred embodiment, have been shown and described. All changes and modifications that come within the spirit of the invention are desired to be protected.

We claim:

1. An interlace-to-progressive scan conversion system, comprising:
   a prefilter having a prefiltered signal as an output;
   a motion estimator having the prefiltered signal as input and a motion-corrected signal as an output;
   an adaptive filter having the prefiltered signal and the motion-corrected signal as inputs; wherein:
   the adaptive filter comprises a three-stage adaptive recursive filter, wherein:
      a first stage comprises a function that selects between using static pixels data and moving pixels data from a next field;
      a second stage comprises a function that selects a more valid set of data between motion compensated data from a previous field and the pixels selected by the first stage; and
      a third stage comprises a function that combines an intra-field interpolation with the more valid set of data selected by the second stage.

2. The interlace-to-progressive scan conversion system of claim 1, wherein the prefilter comprises a spatial line average filter.

3. The interlace-to-progressive scan conversion system of claim 1, wherein the motion estimator comprises a 3-D recursive search sub-component.

4. The interlace-to-progressive scan conversion system of claim 1, wherein the motion estimator comprises a motion vector correction sub-component.

5. The interlace-to-progressive scan conversion system of claim 1, wherein the motion estimator comprises a block erosion sub-component.

6. An interlace-to-progressive scan conversion system, comprising:
   a spatial line averaging prefilter having a prefiltered signal as an output;
   a motion estimator having the prefiltered signal as input and a motion-corrected signal as an output, the motion estimator comprising:
      a 3-D recursive search sub-component;
      a motion vector correction sub-component;
      a block erosion sub-component;
   a three-stage adaptive recursive filter, wherein:
      a first stage comprises a function that selects between using static pixels data and moving pixels data from a next field;
      a second stage comprises a function that selects a more valid set of data between motion compensated data from a previous field and the pixels selected by the first stage; and
      a third stage comprises a function that combines an intra-field interpolation with the more valid set of data selected by the second stage.

7. The interlace-to-progressive scan conversion system of claim 6, wherein the 3-D recursive search sub-component resolves motion vectors to at least quarter-pixel accuracy.

8. The interlace-to-progressive scan conversion system of claim 7, wherein the look-up table consists of:

$$US_n = \left\{ \begin{pmatrix} 0 \\ 0 \end{pmatrix}, \begin{pmatrix} 0 \\ 1 \end{pmatrix}, \begin{pmatrix} 0 \\ -1 \end{pmatrix}, \begin{pmatrix} 1 \\ 0 \end{pmatrix}, \begin{pmatrix} -1 \\ 0 \end{pmatrix}, \begin{pmatrix} 0 \\ 2 \end{pmatrix}, \right.$$
$$\left. \begin{pmatrix} 0 \\ -2 \end{pmatrix}, \begin{pmatrix} 3 \\ 0 \end{pmatrix}, \begin{pmatrix} -3 \\ 0 \end{pmatrix}, \begin{pmatrix} 0 \\ \frac{1}{4} \end{pmatrix}, \begin{pmatrix} 0 \\ -\frac{1}{4} \end{pmatrix}, \begin{pmatrix} \frac{1}{4} \\ 0 \end{pmatrix}, \begin{pmatrix} -\frac{1}{4} \\ 0 \end{pmatrix} \right\}.$$

9. The interlace-to-progressive scan conversion system of claim 6, wherein the motion estimator includes a bilinear interpolator.

10. The interlace-to-progressive scan conversion system of claim 9, wherein a value of a first estimator is set to a value of a second estimator if:

$$e(\overline{MV}_a, \vec{X} - \overline{SMV}_a, t) > e(\overline{MV}_b, \vec{X} - \overline{SMV}_b, t) + Th$$

and wherein the value of the second estimator is set to the value of the first estimator if:

$$e(\overline{MV}_b, \vec{X} - \overline{SMV}_b, t) > e(\overline{MV}_a, \vec{X} - \overline{SMV}_a, t) + Th$$

where Th is a fixed threshold.

11. The interlace-to-progressive scan conversion system of claim 6, wherein an error function of the motion estimator includes penalties related to a length of the difference vector between a given candidate vector and a plurality of neighboring vectors.

12. The interlace-to-progressive scan conversion system of claim 11, wherein the error function is defined by:

$$e(\overline{C}, x, y, t) = \sum_{x \in B(x,y,t)} |F(x, y, t) - F(x - C_x, y - C_y, t - T)| + \alpha \cdot \|\overline{U}(x, y, t)\|.$$

13. The interlace-to-progressive scan conversion system of claim 11, wherein the motion estimator assumes that a motion vector for an object between a previous field and a current field is the same as a motion vector for the object between the current field and a next field.

14. The interlace-to-progressive scan conversion system of claim 13, wherein a motion vector error correction function is defined by:

$$\overline{MV}(x, y, t) = \begin{cases} \begin{pmatrix} 0 \\ 0 \end{pmatrix}, & (e_m(x, y, t) \geq e_s(x, y, t)) \\ \overline{MV}(x, y, t), & (e_m(x, y, t) < e_s(x, y, t)) \end{cases}$$

where:

$$e_m(x, y, t) = \frac{\sum_{x \in X} |F(X) - F(C)| + \sum_{x \in X} |F(X) - F(D)|}{2}$$

$$e_s(x, y, t) = \frac{\sum_{x \in X} |F(X) - F(A)| + \sum_{x \in X} |F(X) - F(B)|}{2}$$

and where A, B, C, D, and X are blocks containing ends of candidate motion vectors, X being in the current field, A and C being in the previous field, and B and D being in the next field.

15. The interlace-to-progressive scan conversion system of claim 13, wherein a motion vector error correction function is defined by:

$$\overline{MV}(x, y, t) = \begin{cases} \begin{pmatrix} 0 \\ 0 \end{pmatrix}, & (e_m(x, y, t) \geq e_s(x, y, t)) \\ \overline{MV}(x, y, t), & (e_m(x, y, t) < e_s(x, y, t)) \end{cases}$$

where:

$$e_m(x, y, t) = \sum |F(C) - F(D)|$$
$$e_s(x, y, t) = \sum |F(A) - F(B)|$$

and where A, B, C, D, and X are blocks containing ends of candidate motion vectors, X being in the current field, A and C being in the previous field, and B and D being in the next field.

16. The interlace-to-progressive scan conversion system of claim 6, wherein a cost function is defined by:

$$\forall F(x,y,t) \in B(x,y,t):$$

$$D = |F(x,y,t) - F(x - MV_x, y - MV_y, t-1)|$$

$$TD = TD + D$$

$$Diff = D - EstErr$$

$$EstErr = EstErr + (\delta Diff));$$

$$Dev = Dev + \delta(|Diff| - Dev).$$

17. The interlace-to-progressive scan conversion system of claim 6, wherein the block erosion sub-component divides each block according to:

$$B(x,y,t) = \{(x,y) | X_x - X/2 \leq x \leq X_x + X/2 \wedge X_y - Y/2 \leq y \leq X_y + Y/2\}$$

wherein a vector $\overline{MV}(x,y,t)$ is assigned, into four sub-blocks $B_{i,j}(x, y, t)$ $$B_{i,j}(x, y, t) = \left\{(x, y) \,\middle|\, X_x - (1-i) \cdot \frac{X}{4} \leq x \leq X_x + (1+i) \cdot \frac{X}{4} \wedge X_y(1-j) \cdot \frac{Y}{4} \leq y \leq X_y + (1+j) \cdot \frac{Y}{4}\right\}$$

and wherein the variables I and j take the values +1 and −1; wherein a vector $MV_{ij}(x,y,t)$ is assigned to the pixels of each of the sub-blocks $B_{ij}(x,y,t)$:

$$\forall (x,y) \in B_{i,j}(x,y,t): \overline{MV}_{i,j}(x,y,t) = \overline{MV}_{i,j}(\overline{X},t)$$

wherein:

$$\overline{MV}_{i,j}(\overline{X},t) = \text{med}[\overline{MV}(x+i \cdot X,y,t), \overline{MV}(\overline{X},t), \overline{MV}(x,y+j \cdot Y,t)]$$

wherein the median function is a median on the x and y vector components separately; and wherein a resulting vector is replaced by an original motion vector unless the resulting vector is equal to one of the three input vectors.

18. The interlace-to-progressive scan conversion system of claim 6, wherein the first stage selection function is given by:

$$F_n(x, y, t) = \begin{cases} F(x + MV_x(x, y, t), y + MV_y(x, y, t), t+1), & (D_m < D_s) \\ F(x, y, t+1), & (D_m \geq D_s) \end{cases}$$

where:

$$D_s = \sum_{k=-2}^{2} C_v(k) \cdot |F(x, y+k, t) - F(x, y+k, t+1)|$$

$$D_m = \sum_{k=-2}^{2} C_v(k) \cdot |F(x, y+k, t) - F(x - MV_x(x, y, t), y - MV_y(x, y, t) + k, t+1)|. \tag{3.22}$$

19. The interlace-to-progressive scan conversion system of claim 6, wherein the third stage combining function is given by:

$$F_o(x, y, t) = \begin{cases} F(x, y, t), & (y \bmod 2 = t \bmod 2) \\ (c_i \cdot F_i(x, y, t)) + (1 - c_i)(c_p \cdot F_p(x, y, t) + (1 - c_p)F_n(x, y, t)), & \text{(otherwise)} \end{cases}$$

wherein $c_i$ and $c_p$ are adaptive coefficients ranging from 0 to 1; $F_n$ is given by:

$$F_n(x, y, t) = \begin{cases} F(x + MV_x(x, y, t), y + MV_y(x, y, t), t+1), & (D_m < D_s) \\ F(x, y, t+1), & (D_m \geq D_s) \end{cases}$$

wherein intra-field interpolation is given by:

$$F_i(x, y, t) = \frac{F(x, y-1, t) + F(x, y+1, t)}{2}$$

and wherein backward data prediction is given by:

$$F_p(x,y,t) = F(x - MV_x(x,y,t), y - MV_y(x,y,t), t-1).$$

20. An interlace-to-progressive scan conversion system, comprising:
a spatial line averaging prefilter having a prefiltered signal as an output;
a motion estimator having the prefiltered signal as input and a motion-corrected signal as an output, the motion estimator comprising:
a 3-D recursive search sub-component having a bilinear interpolator;
a motion vector correction sub-component having an error function, the error function including penalties related to a length of the difference vector between a given candidate vector and a plurality of neighboring vectors;
a block erosion sub-component;
wherein the motion estimator assumes that a motion vector for an object between a previous field and a current field is the same as a motion vector for the object between the current field and a next field
a three-stage adaptive recursive filter having the prefiltered output and the motion-corrected output as inputs, the three stages comprising:

a first stage that comprises a function that selects between using static pixels data and moving pixels data from a next field;

a second stage that comprises a function that selects a more valid set of data between motion compensated data from a previous field and the pixels selected by the first stage; and a third stage that comprises a function that combines an intra-field interpolation with the more valid set of data selected by the second stage.

21. An interlace-to-progressive scan conversion system, comprising:

a spatial line averaging prefilter having a prefiltered signal as an output;

a motion estimator having the prefiltered signal as input and a motion-corrected signal as an output, the motion estimator comprising: a 3-D recursive search sub-component; a motion vector correction sub-component; and a block erosion sub-component; wherein:

the 3-D recursive search sub-component includes a bilinear interpolator defined by:

$$F(x, y, t) = (yf \cdot xf \cdot F(xi, yi, t)) + (yf \cdot (1 - xf) \cdot F(xi + 1, yi, t)) +$$
$$((1 - yf) \cdot xf \cdot F(xi, yi + 1, t)) + ((1 - yf) \cdot (1 - xf) \cdot$$
$$F(xi + 1, yi + 1, t)$$

where:

$$yf = \lfloor y \rfloor \qquad xf = \lfloor x \rfloor$$

and:

$$yi = y - \lfloor y \rfloor \qquad xi = x - \lfloor x \rfloor$$

and wherein a value of a first estimator is set to a value of a second estimator if:

$$e(\overline{MV}_a, \bar{X} - \overline{SMV}_a, t) > e(\overline{MV}_b, \bar{X} - \overline{SMV}_b, t) + Th$$

and wherein the value of the second estimator is set to the value of the first estimator if:

$$e(\overline{MV}_b, \bar{X} - \overline{SMV}_b, t) > e(\overline{MV}_a, \bar{X} - \overline{SMV}_a, t) + Th$$

where Th is a fixed threshold;

the 3-D recursive search sub-component has a look-up table consisting of:

$$US_n = \left\{ \begin{pmatrix} 0 \\ 0 \end{pmatrix}, \begin{pmatrix} 0 \\ 1 \end{pmatrix}, \begin{pmatrix} 0 \\ -1 \end{pmatrix}, \begin{pmatrix} 1 \\ 0 \end{pmatrix}, \begin{pmatrix} -1 \\ 0 \end{pmatrix}, \begin{pmatrix} 0 \\ 2 \end{pmatrix}, \right.$$
$$\left. \begin{pmatrix} 0 \\ -2 \end{pmatrix}, \begin{pmatrix} 3 \\ 0 \end{pmatrix}, \begin{pmatrix} -3 \\ 0 \end{pmatrix}, \begin{pmatrix} 0 \\ \frac{1}{4} \end{pmatrix}, \begin{pmatrix} 0 \\ -\frac{1}{4} \end{pmatrix}, \begin{pmatrix} \frac{1}{4} \\ 0 \end{pmatrix}, \begin{pmatrix} -\frac{1}{4} \\ 0 \end{pmatrix} \right\}$$

a motion vector correction sub-component having an motion vector error correction function defined by:

$$\overline{MV}(x, y, t) = \begin{cases} \begin{pmatrix} 0 \\ 0 \end{pmatrix}, & (e_m(x, y, t) \geq e_s(x, y, t)) \\ \overline{MV}(x, y, t), & (e_m(x, y, t) < e_s(x, y, t)) \end{cases}$$

where:

$$e_m(x, y, t) = \sum |F(C) - F(D)|$$
$$e_s(x, y, t) = \sum |F(A) - F(B)|$$

and where A, B, C, D, and X are blocks containing ends of candidate motion vectors, X being in the current field, A and C being in the previous field, and B and D being in the next field;

a block erosion sub-component that divides each block according to:

$$B(x,y,t) = \{(x,y) | X_x - X/2 \leq x \leq X_x + X/2 \wedge X_y - Y/2 \leq y \leq X_y + Y/2\}$$

wherein a vector $\overline{MV}(x,y,t)$ is assigned, into four sub-blocks $B_{i,j}(x, y, t)$ $$B_{i,j}(x, y, t) = \left\{ (x, y) \mid X_x - (1 - i) \cdot \frac{X}{4} \leq x \leq \right.$$
$$\left. X_x + (1 + i) \cdot \frac{X}{4} \wedge X_y (1 - j) \cdot \frac{Y}{4} \leq y \leq X_y + (1 + j) \cdot \frac{Y}{4} \right\}$$

and wherein the variables I and j take the values +1 and −1; wherein a vector $MV_{ij}(x,y,t)$ is assigned to the pixels of each of the sub-blocks $B_{ij}(x,y,t)$:

$$\forall (x,y) \in B_{i,j}(x,y,t): \overline{MV}_{i,j}(x,y,t) = \overline{MV}_{i,j}(\bar{X},t)$$

wherein:

$$\overline{MV}_{i,j}(\bar{X},t) = \text{med}[\overline{MV}(x+i\cdot X,y,t), \overline{MV}(\bar{X},t), \overline{MV}(x,y+j\cdot Y,t)]$$

wherein the median function is a median on the x and y vector components separately; and wherein a resulting vector is replaced by an original motion vector unless the resulting vector is equal to one of the three input vectors;

a three-stage adaptive recursive filter having the prefiltered signal and motion-corrected signals as output, the three stages comprising:

a first stage comprises a function that selects between using static pixels data and moving pixels data from a next field according to the function:

$$F_n(x, y, t) = \begin{cases} F(x + MV_x(x, y, t), y + MV_y(x, y, t), t+1), & (D_m < D_s) \\ F(x, y, t+1), & (D_m \geq D_s) \end{cases}$$

where:

$$D_s = \sum_{k=-2}^{2} C_v(k) \cdot$$
$$|F(x, y+k, t) - F(x, y+k, t+1)|$$

$$D_m = \sum_{k=-2}^{2} C_v(k) \cdot |F(x, y+k, t) - F(x - MV_x(x, y, t),$$
$$y - MV_y(x, y, t) + k, t+1)|$$

a second stage comprises a function that selects a more valid set of data between motion compensated data from a previous field and the pixels selected by the first stage; and a third stage comprises a function that combines an intra-field interpolation with the more valid set of data selected by the second stage according to the function:

$$F_o(x, y, t) = \begin{cases} F(x, y, t), & (y \bmod 2 = t \bmod 2) \\ (c_i \cdot F_i(x, y, t)) + (1 - c_i)(c_p \cdot F_p(x, y, t) + (1 - c_p)F_n(x, y, t)), & \text{(otherwise)} \end{cases}$$

wherein $c_i$ and $c_p$ are adaptive coefficients ranging from 0 to 1; $F_n$ is given by:

$$F_n(x, y, t) = \begin{cases} F(x + MV_x(x, y, t), y + MV_y(x, y, t), t+1), & (D_m < D_s) \\ F(x, y, t+1), & (D_m \geq D_s) \end{cases}$$

wherein intra-field interpolation is given by:

$$F_i(x, y, t) = \frac{F(x, y-1, t) + F(x, y+1, t)}{2}$$

and wherein backward data prediction is given by:

$$F_p(x,y,t) = F(x - MV_x(x,y,t), y - MV_y(x,y,t), t-1).$$

22. A method for converting an interlaced image to a progressive scan image, the method comprising:
providing an input signal corresponding to an image;
prefiltering the input signal with a spatial line averaging prefilter;
estimating motion in the image by:
performing a 3-D recursive search;
performing a motion vector correction;
performing a block erosion to reduce blockiness in the progressive scan image;
filtering the signal in three stages:
in the first stage selecting between using static pixels data and moving pixels data from a next field;
in the second stage selecting a more valid set of data between motion compensated data from a previous field and the pixels selected by the first stage; and
in the third stage combining an intra-field interpolation with the more valid set of data selected by the second stage.

23. A method for converting an interlaced image to a progressive scan image, the method comprising:
providing an input signal corresponding to an image;
prefiltering the input signal with a spatial line averaging prefilter;
estimating motion in the image by:
assuming that a motion vector for an object between a previous field and a current field is the same as a motion vector for the object between the current field and a next field;
performing a 3-D recursive search;
performing a motion vector correction in which the error function penalizes a candidate vector based on a length of a difference vector between the candidate vector and a plurality of neighboring vectors;
performing a block erosion to reduce blockiness in the progressive scan image;
filtering the signal in three stages:
in the first stage selecting between using static pixels data and moving pixels data from a next field;
in the second stage selecting a more valid set of data between motion compensated data from a previous field and the pixels selected by the first stage; and
in the third stage combining an intra-field interpolation with the more valid set of data selected by the second stage.

* * * * *

UNITED STATES PATENT AND TRADEMARK OFFICE
CERTIFICATE OF CORRECTION

PATENT NO. : 6,940,557 B2
DATED : September 6, 2005
INVENTOR(S) : Handjojo et al.

It is certified that error appears in the above-identified patent and that said Letters Patent is hereby corrected as shown below:

Column 2,
Line 22, after "Unfortunately" insert -- , --.

Column 16,
Line 59, delete "bidirectional" and insert -- bi-directional --.

Column 17,
Line 57, after "$T_a$" insert -- , --.

Column 28,
Line 61, after "246" insert -- . --.

Column 29,
Line 33, after "246" insert -- . --.

Column 31,
Line 17, before "input" insert -- the --.
Line 17, after "input" delete ";" and insert -- , --.

Signed and Sealed this

Second Day of May, 2006

JON W. DUDAS
*Director of the United States Patent and Trademark Office*